(12) United States Patent
Park et al.

(10) Patent No.: US 9,137,624 B2
(45) Date of Patent: Sep. 15, 2015

(54) METHOD AND DEVICE FOR PERFORMING RANGING IN A WIRELESS COMMUNICATION SYSTEM

(75) Inventors: Gi Won Park, Anyang-si (KR); Young Soo Yuk, Anyang-si (KR)

(73) Assignee: LG Electronics Inc., Seoul (KR)

( * ) Notice: Subject to any disclaimer, the term of this patent is extended or adjusted under 35 U.S.C. 154(b) by 80 days.

(21) Appl. No.: 14/002,922

(22) PCT Filed: Feb. 20, 2012

(86) PCT No.: PCT/KR2012/001252
§ 371 (c)(1),
(2), (4) Date: Sep. 11, 2013

(87) PCT Pub. No.: WO2012/121498
PCT Pub. Date: Sep. 13, 2012

(65) Prior Publication Data
US 2014/0056249 A1  Feb. 27, 2014

Related U.S. Application Data

(60) Provisional application No. 61/449,095, filed on Mar. 4, 2011, provisional application No. 61/449,724, filed on Mar. 7, 2011.

(51) Int. Cl.
*H04W 4/00* (2009.01)
*H04W 24/10* (2009.01)
*H04W 28/18* (2009.01)
*H04W 68/00* (2009.01)
*H04W 72/04* (2009.01)
*H04W 84/12* (2009.01)
*H04W 92/18* (2009.01)

(52) U.S. Cl.
CPC .............. *H04W 4/005* (2013.01); *H04W 24/10* (2013.01); *H04W 28/18* (2013.01); *H04W 68/00* (2013.01); *H04W 72/042* (2013.01); *H04W 72/0413* (2013.01); *H04W 72/0453* (2013.01); *H04W 84/12* (2013.01); *H04W 92/18* (2013.01)

(58) Field of Classification Search
CPC ............ H04W 68/02; H04W 52/0229; H04W 52/0216; H04W 24/00; H04W 4/005; H04W 68/025
USPC ................................................... 370/329, 348
See application file for complete search history.

(56) References Cited

U.S. PATENT DOCUMENTS

2008/0232330 A1\* 9/2008 Lee et al. ...................... 370/335
2010/0099442 A1\* 4/2010 Chin et al. ..................... 455/466

(Continued)

OTHER PUBLICATIONS

"Cellular Based Machine to Machine Communication with Un-peer5peer Protocol Stack"; Chen, et al.; 2009 IEEE 70th Vehicular Technology Conference Fall (VTC 2009—Fall); pp. 1-5, Sep. 23, 2009.

(Continued)

*Primary Examiner* — Mohammad Anwar
(74) *Attorney, Agent, or Firm* — Dentons US LLP

(57) ABSTRACT

A method and device for performing wireless communication ranging are provided. A machine-to-machine (M2M) device receives a paging message from a base station, transmits a bandwidth request (BR) preamble sequence to the base station, receives a first UL grant to allocate an uplink (UL) resource for the transmission of a BR header, transmits the BR header including a ranging request indication parameter to the base station through a UL resource allocated by the first UL grant, receives a second UL grant to allocated a UL resource for transmission of a ranging request message from the bases station, and transmits the ranging request message to the base station through a UL resource allocated by the second UL grant.

8 Claims, 16 Drawing Sheets

(56) References Cited

U.S. PATENT DOCUMENTS

| | | |
|---|---|---|
| 2011/0013717 A1* | 1/2011 | Josiam et al. .................. 375/295 |
| 2011/0053619 A1 | 3/2011 | Shaheen et al. |
| 2012/0178463 A1* | 7/2012 | Lin et al. ....................... 455/450 |
| 2014/0010140 A1* | 1/2014 | Martinez Tarradell et al. ............................. 370/312 |

OTHER PUBLICATIONS

"System Architecture Challenges in the Home M2M Network" Starsinic; 2010 Long Island Systems Applications and Technology Conference (LISAT); pp. 1-7, May 7, 2010.

* cited by examiner

METHOD AND DEVICE FOR PERFORMING RANGING IN A WIRELESS COMMUNICATION SYSTEM

This application is a 35 USC §371 National Stage entry of International Application No. PCT/KR2012/001252 filed on Feb. 20, 2012, and claims priority to U.S. Provisional Application Nos. 61/449,095, filed Mar. 4, 2011; and 61/449,724 filed Mar. 7, 2011, all of which are incorporated by reference in their entirety herein.

BACKGROUND OF THE INVENTION

1. Field of the Invention

The present invention relates to a wireless communication, and more particularly, to a method and apparatus for performing ranging in a wireless communication system.

2. Related Art

The institute of electrical and electronics engineers (IEEE) 802.16e standard was adopted in 2007 as a sixth standard for international mobile telecommunication (IMT)-2000 in the name of 'WMAN-OFDMA TDD' by the ITU-radio communication sector (ITU-R) which is one of sectors of the international telecommunication union (ITU). An IMT-advanced system has been prepared by the ITU-R as a next generation (i.e., 4th generation) mobile communication standard following the IMT-2000. It was determined by the IEEE 802.16 working group (WG) to conduct the 802.16m project for the purpose of creating an amendment standard of the existing IEEE 802.16e as a standard for the IMT-advanced system. As can be seen in the purpose above, the 802.16m standard has two aspects, that is, continuity from the past (i.e., the amendment of the existing 802.16e standard) and continuity to the future (i.e., the standard for the next generation IMT-advanced system). Therefore, the 802.16m standard needs to satisfy all requirements for the IMT-advanced system while maintaining compatibility with a mobile WiMAX system conforming to the 802.16e standard.

There is ongoing development on the IEEE 802.16p standard optimized for machine-to-machine (M2M) communication based on the IEEE 802.16e standard and the IEEE 802.16m standard. The M2M communication can be defined as an information exchange performed between a subscriber station and a server or between subscriber stations in a core network without any human interaction. In the IEEE 802.16p standard, there is an ongoing discussion on enhancement of medium access control (MAC) of the IEEE 802.16 standard and a minimum change of an orthogonal frequency division multiple access (OFDMA) physical layer (PHY) in licensed bands. Due to the discussion on the IEEE 802.16p standard, a wide area wireless coverage is required in the licensed band, and a scope of applying automated M2M communication can be increased for an observation and control purpose.

When accessing a network, requirements demanded by many M2M applications are significantly different from requirements for human-initiated or human-controlled network access. The M2M application can include vehicular telematics, healthcare monitoring of bio-sensors, remote maintenance and control, smart metering, an automated service of a consumer device, etc. The requirements of the M2M application can include very lower power consumption, larger numbers of devices, short burst transmission, device tampering detection and reporting, improved device authentication, etc.

Ranging implies a process for maintaining quality of radio frequency (RF) communication between the UE and the BS. According to the ranging, a timing offset, a frequency offset, and a power adjustment value can be accurately obtained, and transmission of the UE can be aligned with the BS. A plurality of M2M devices can perform contention-based ranging with each other. The plurality of M2M devices may belong to an M2M group. M2M devices belonging to the same M2M group share a criterion of the same M2M service application and/or the same M2M user.

Due to a characteristic of an M2M application, M2M devices without mobility may perform ranging to a base station. The M2M devices without mobility may perform ranging by using a relatively small resource as compared with a case where a general user equipment performs ranging. Accordingly, a method for efficiently performing ranging of the M2M device which uses a smaller resource is required.

SUMMARY OF THE INVENTION

The present invention provides a method and apparatus for performing ranging in a wireless communication system. Further, the present invention provides a method for performing ranging through a bandwidth request channel (BRCH).

In an aspect, a method for performing ranging, by a machine-to-machine (M2M) device, in a wireless communication system is provided. The method includes receiving a paging message from a base station, transmitting a bandwidth request (BR) preamble sequence to the base station, receiving a first uplink (UL) grant for receiving a UL resource for transmission of a BR header from the bases station, transmitting the BR header with a ranging request indication parameter to the base station through the UL resource allocated by the first UL grant, receiving a second UL grant for receiving a UL resource for transmission for a ranging request message from the base station, and transmitting the ranging request message to the base station through the UL resource allocated by the second UL grant.

The BR preamble sequence may be transmitted through a M2M bandwidth request channel (BRCH) allocated by the paging message.

The BR preamble sequence may be transmitted through the BRCH.

The BR header may be a BR header with a station identifier (STID) or a BR header without the STID.

The ranging request indication parameter may be 1 bit.

The second UL grant may be received through a CDMA allocation A-MAP IE.

The method may further include transmitting a ranging response message to the base station as a response to the ranging request message.

In another aspect, a method for performing ranging, by a machine-to-machine (M2M) device, in a wireless communication system is provided. The method includes receiving a paging message from a base station, transmitting a bandwidth request (BR) preamble sequence, an M2M group identifier (ID), and a pre-defined BR index, receiving an uplink (UL) grant for receiving a UL resource for transmission of a ranging request message from the base station, and transmitting the ranging request message to the base station through the UL resource allocated by the UL grant.

The BR preamble sequence may be transmitted through a M2M bandwidth request channel (BRCH) allocated by the paging message.

The BR preamble sequence may be transmitted through the BRCH.

The pre-defined BR index may be included in a pre-defined BR index parameter.

The pre-defined BR index parameter may include a BR Action field.

The second UL grant may be received through a CDMA allocation A-MAP IE.

The method may further include transmitting a ranging response message to the base station as a response to the ranging request message.

An M2M device without mobility may efficiently perform ranging by using a relatively small radio resource.

DESCRIPTION OF EXEMPLARY EMBODIMENTS

A technology below can be used in a variety of wireless communication systems, such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented using radio technology, such as universal terrestrial radio access (UTRA) or CDMA2000. TDMA can be implemented using radio technology, such as global system for mobile communications (GSM)/general packet radio service (GPRS)/enhanced data rates for GSM evolution (EDGE). OFDMA can be implemented using radio technology, such as IEEE 802.11(Wi-Fi), IEEE 802.16 (WiMAX), IEEE 802-20, or Evolved UTRA (E-UTRA). IEEE 802.16m is the evolution of IEEE 802.16e, and it provides a backward compatibility with an IEEE 802.16e-based system. UTRA is part of a universal mobile telecommunications system (UMTS). 3rd generation partnership project (3GPP) long term evolution (LTE) is part of evolved UMTS (E-UMTS) using evolved-UMTS terrestrial radio access (E-UTRA), and it adopts OFDMA in downlink (DL) and SC-FDMA in uplink (UL). LTE-A (advanced) is the evolution of 3GPP LTE.

IEEE 802.16m is chiefly described as an example in order to clarify the description, but the technical spirit of the present invention is not limited to IEEE 802.16m.

Figure 1:
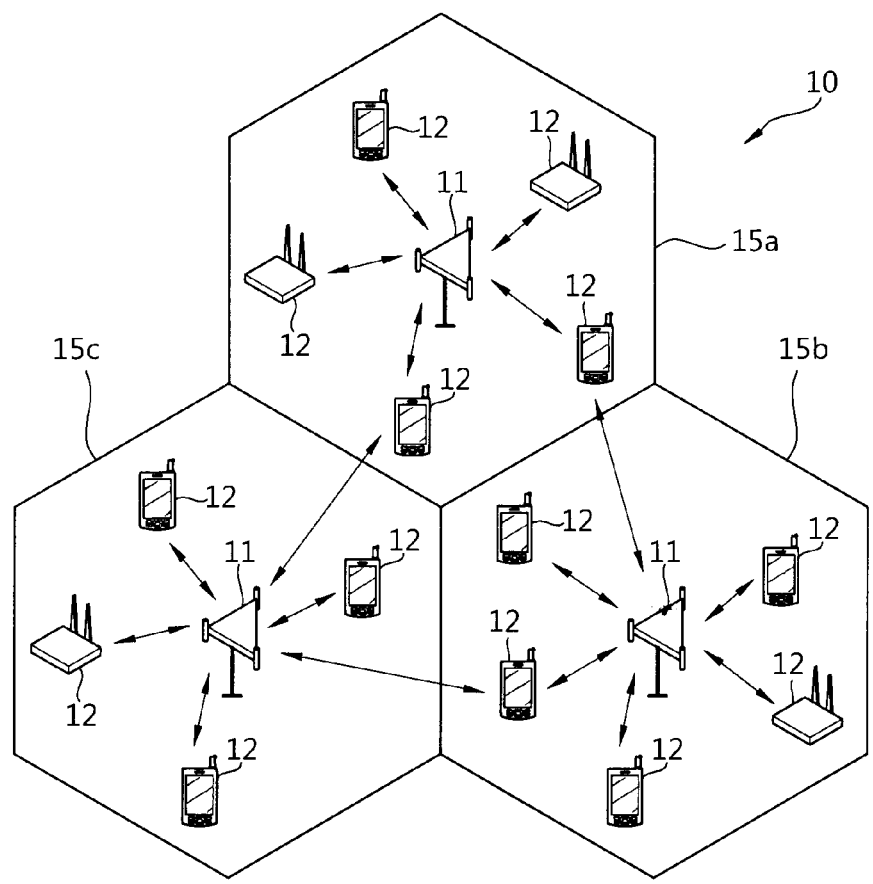
FIG. 1 shows a wireless communication system.

FIG. 1 shows a wireless communication system.

Referring to FIG. 1, the wireless communication system 10 includes one or more base stations (BSs) 11. The BSs 11 provide communication services to respective geographical areas (in general called 'cells') 15a, 15b, and 15c. Each of the cells can be divided into a number of areas (called 'sectors'). A user equipment (UE) 12 can be fixed or mobile and may be referred to as another terminology, such as a mobile station (MS), a mobile terminal (MT), a user terminal (UT), a subscriber station (SS), a wireless device, a personal digital assistant (PDA), a wireless modem, or a handheld device. In general, the BS 11 refers to a fixed station that communicates with the UEs 12, and it may be referred to as another terminology, such as an evolved-NodeB (eNB), a base transceiver system (BTS), or an access point.

The UE generally belongs to one cell. A cell to which a UE belongs is called a serving cell. A BS providing the serving cell with communication services is called a serving BS. A wireless communication system is a cellular system, and so it includes other cells neighboring a serving cell. Other cells neighboring the serving cell are called neighbor cells. A BS providing the neighbor cells with communication services is called as a neighbor BS. The serving cell and the neighbor cells are relatively determined on the basis of a UE.

This technology can be used in the downlink (DL) or the uplink (UL). In general, DL refers to communication from the BS 11 to the UE 12, and UL refers to communication from the UE 12 to the BS 11. In the DL, a transmitter may be part of the BS 11 and a receiver may be part of the UE 12. In the UL, a transmitter may be part of the UE 12 and a receiver may be part of the BS 11.

Figure 2:
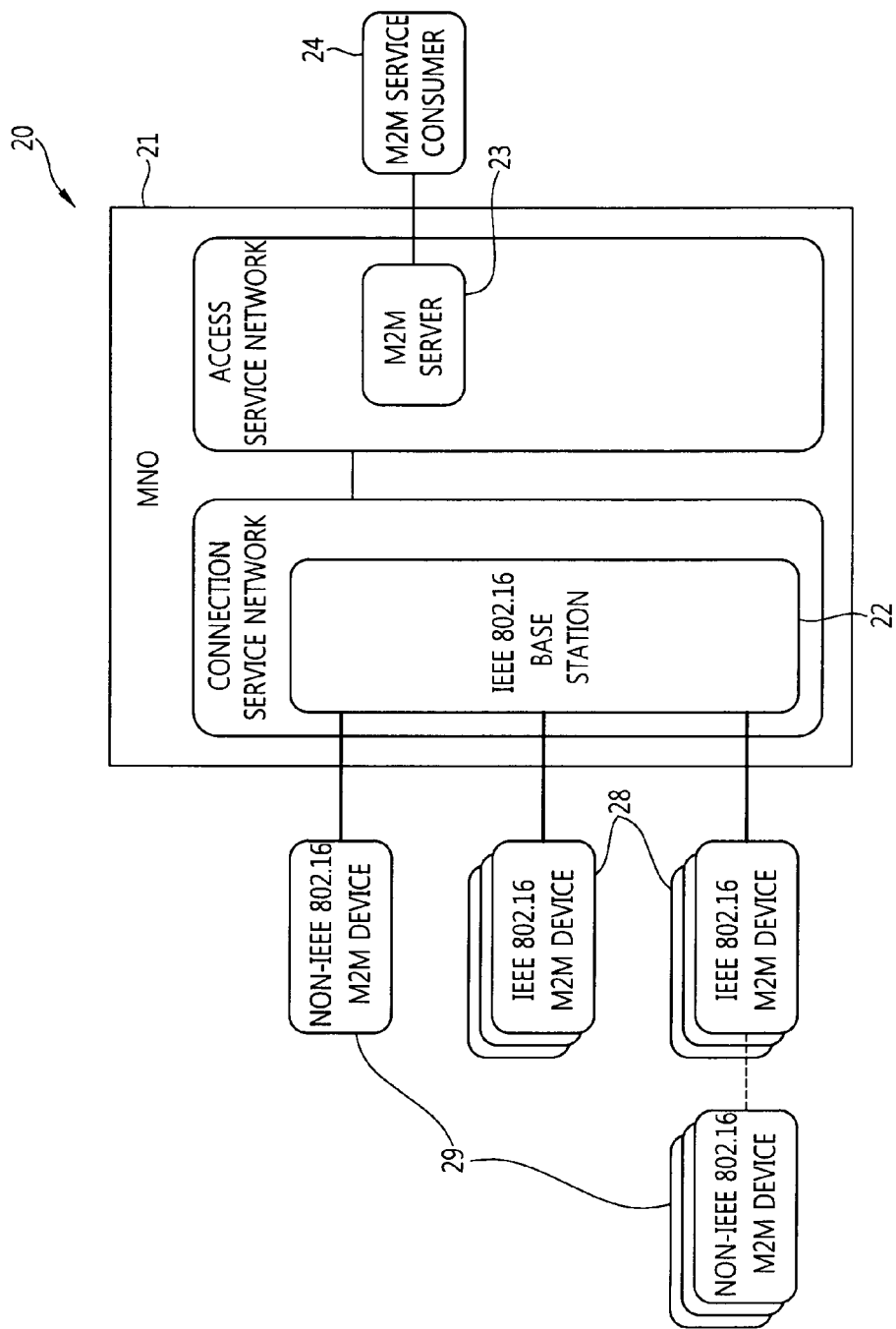
FIG. 2 shows basic M2M service system architecture of IEEE 802.16 supporting machine-to-machine (M2M) communication.

FIG. 2 shows basic M2M service system architecture of IEEE 802.16 supporting machine-to-machine (M2M) communication.

A basic M2M service system architecture 20 includes a mobile network operator (MNO) 21, a M2M service consumer 24, at least one IEEE 802.16 M2M device (hereinafter, 802.16 M2M device) 28, and at least one non-IEEE 802.16 M2M device 29. The MNO 21 includes an access service network (ASN) and a connectivity service network (CSN). The 802.16 M2M device 28 is an IEEE 802.16 mobile station (MS) having a M2M functionality. A M2M server 23 is an entity for communicating with one or more 802.16 M2M devices 28. The M2M server 23 has an interface accessibly by the M2M service consumer 24. The M2M service consumer 24 is a user of a M2M service. The M2M server 23 may be located inside or outside the CSN, and can provide a specific M2M service to the one or more 802.16 M2M devices 28. The ASN may include an IEEE 802.16 base station (BS) 22. A M2M application operates based on the 802.16 M2M device 28 and the M2M server 23.

The basic M2M service system architecture 20 supports two types of M2M communication, i.e., M2M communication between one or more 802.16 M2M devices and a M2M server or point-to-multipoint communication between the 802.16 M2M devices and an IEEE 802.16 BS. The basic M2M service system architecture of FIG. 2 allows the 802.16 M2M device to operate as an aggregation point for a non-IEEE 802.16 M2M device. The non-IEEE 802.16 M2M device uses a radio interface different from IEEE 802.16 such as IEEE 802.11, IEEE 802.15, PLC, or the like. In this case, the non-IEEE 802.16 M2M device is not allowed to change the radio interface to IEEE 802.16.

Figure 3:
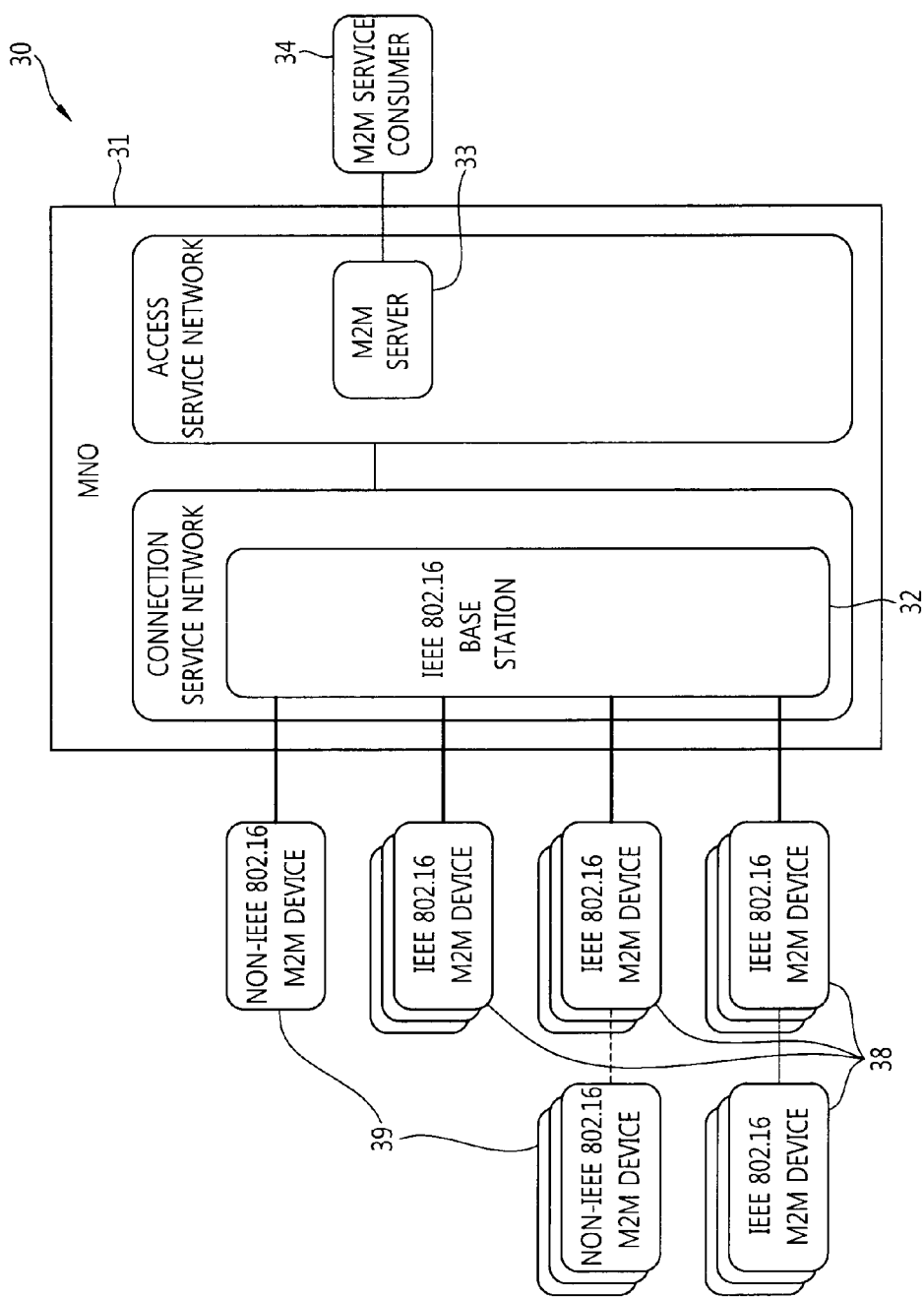
FIG. 3 shows advanced M2M service system architecture of IEEE 802.16 supporting M2M communication.

FIG. 3 shows advanced M2M service system architecture of IEEE 802.16 supporting M2M communication.

In the advanced M2M service system architecture, an 802.16 M2M device can operate as an aggregation point for a non-IEEE 802.16 M2M device, and also can operate as an aggregation point for an 802.16 M2M device. In this case, in order to perform an aggregation function for the 802.16 M2M device and the non-802.16 M2M device, the radio interface can be changed to IEEE 802.16. In addition, the advanced M2M service system architecture can support a peer-to-peer (P2P) connection between 802.16 M2M devices. In this case, the P2P connection can be established on either IEEE 802.16 or another radio interface such as IEEE 802.11, IEEE 802.15, PLC, or the like.

Hereinafter, IEEE 802.16e and IEEE 802.16m frame structures will be described.

Figure 4:
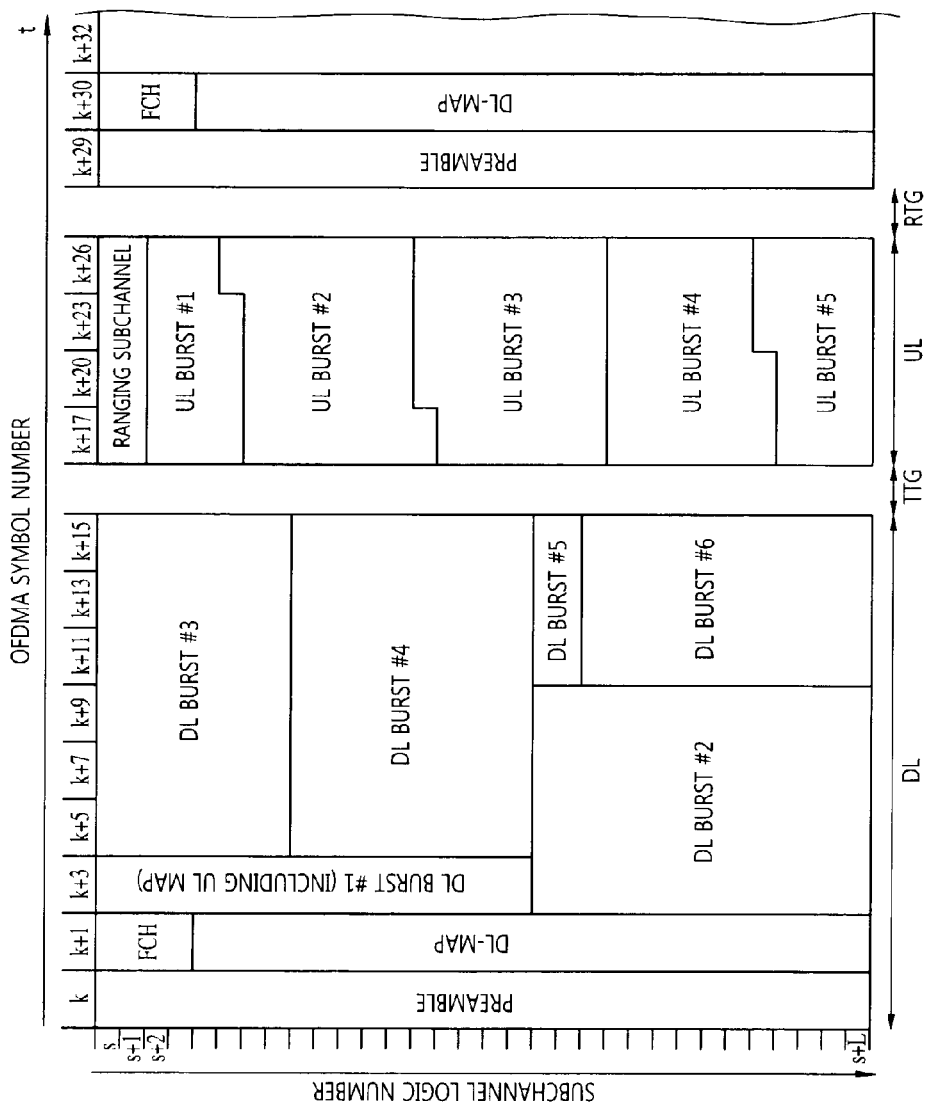
FIG. 4 shows an example of an IEEE 802.16e frame structure.

FIG. 4 shows an example of an IEEE 802.16e frame structure.

A time division duplex (TDD) frame structure of IEEE 802.16e is shown in FIG. 4. The TDD frame includes a downlink (DL) transmission period and an uplink (UL) transmission period. The DL transmission period temporally precedes the UL transmission period. The DL transmission period sequentially includes a preamble, a frame control header (FCH), a DL-MAP, a UL-MAP, and a DL burst region. The UL transmission period includes a ranging subchannel and a UL burst region. A guard time for identifying the UL transmission period and the DL transmission period is inserted to a middle portion (between the DL transmission period and the UL transmission period) and a last portion (next to the UL transmission period) of the frame. A transmit/receive transition gap (TTG) is a gap between a DL burst and a subsequent UL burst. A receive/transmit transition gap (RTG) is a gap between a UL burst and a subsequent DL burst.

A preamble is used between a BS and an MS for initial synchronization, cell search, and frequency-offset and channel estimation. The FCH includes information on a length of a DL-MAP message and a coding scheme of the DL-MAP. The DL-MAP is a region for transmitting the DL-MAP message. The DL-MAP message defines access to a DL channel. This implies that the DL-MAP message defines DL channel indication and/or control information. The DL-MAP message includes a configuration change count of a downlink channel descriptor (DCD) and a BS identifier (ID). The DCD describes a DL burst profile applied to a current MAP. The DL burst profile indicates characteristics of a DL physical channel. The DCD is periodically transmitted by the BS by using a DCD message. The UL-MAP is a region for transmitting a UL-MAP message. The UL-MAP message defines access to a UL channel. This implies that the UL-MAP message defines UL channel indication and/or control information. The UL-MAP message includes a configuration change count of an uplink channel descriptor (UCD) and also includes an effective start time of UL allocation defined by the UL-MAP. The UCD describes a UL burst profile. The UL burst profile indicates characteristics of a UL physical channel. The UCD is periodically transmitted by the BS by using a UCD message. The DL burst is a region for transmitting data sent by the BS to the MS. The UL burst is a region for transmitting data sent by the MS to the BS. The fast feedback region is included in a UL burst region of a frame. The fast feedback region is used to transmit information that requires a fast response from the BS. The fast feedback region can be used for CQI transmission. A location of the fast feedback region is determined by the UL-MAP. The location of the fast feedback region may be a fixed location in the frame, or may be a variable location.

Figure 5:
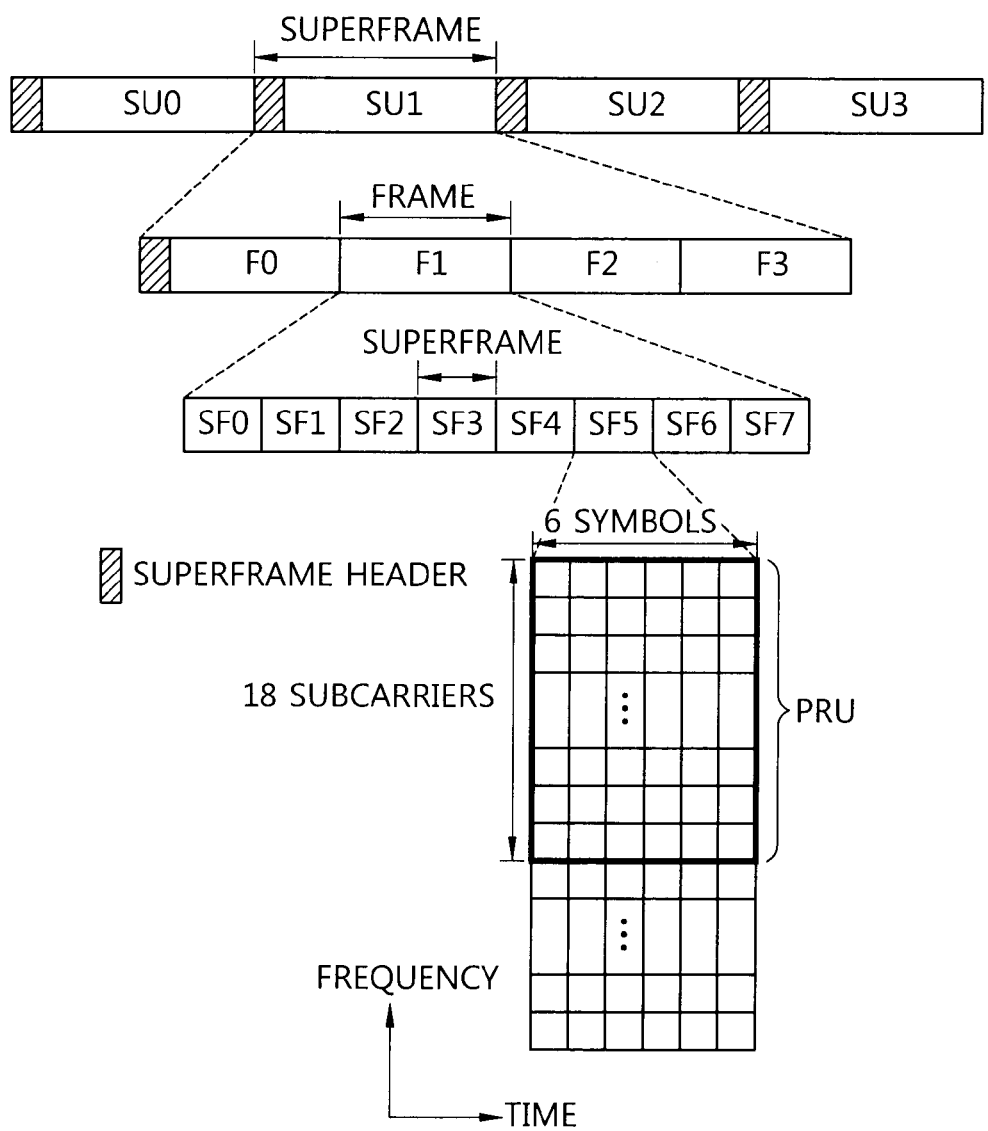
FIG. 5 shows an example of an IEEE 802.16m frame structure.

FIG. 5 shows an example of an IEEE 802.16m frame structure.

Referring to FIG. 5, a superframe (SF) includes a superframe header (SFH) and four frames F0, F1, F2, and F3. Each frame may have the same length in the SF. Although it is shown that each SF has a size of 20 milliseconds (ms) and each frame has a size of 5 ms, the present invention is not limited thereto. A length of the SF, the number of frames included in the SF, the number of SFs included in the frame, or the like may change variously. The number of SFs included in the frame may change variously according to a channel bandwidth and a cyclic prefix (CP) length.

One frame includes 8 subframes SF0, SF1, SF2, SF3, SF4, SF5, SF6, and SF7. Each subframe can be used for UL or DL transmission. One subframe includes a plurality of orthogonal frequency division multiplexing (OFDM) symbols or orthogonal frequency division multiple access (OFDMA) symbols in a time domain, and includes a plurality of subcarriers in a frequency domain. An OFDM symbol is for representing one symbol period, and can be referred to as other terminologies such as an OFDMA symbol, an SC-FDMA symbol, etc., according to a multiple access scheme. The subframe can consist of 5, 6, 7, or 9 OFDMA symbols. However, this is for exemplary purposes only, and thus the number of OFDMA symbols included in the subframe is not limited thereto. The number of OFDMA symbols included in the subframe may change variously according to a channel bandwidth and a CP length. A subframe type may be defined according to the number of OFDMA symbols included in the subframe. For example, it can be defined such that a type-1 subframe includes 6 OFDMA symbols, a type-2 subframe includes 7 OFDMA symbols, a type-3 subframe includes 5 OFDMA symbols, and a type-4 subframe includes 9 OFDMA symbols. One frame may include subframes each having the same type. Alternatively, one frame may include subframes each having a different type. That is, the number of OFDMA symbols included in each subframe may be identical or different in one frame. Alternatively, the number of OFDMA symbols included in at least one subframe of one frame may be different from the number of OFDMA symbols of the remaining subframes of the frame.

Time division duplex (TDD) or frequency division duplex (FDD) can be applied to the frame. In the TDD, each subframe is used in UL or DL transmission at the same frequency and at a different time. That is, subframes included in a TDD frame are divided into a UL subframe and a DL subframe in the time domain. In the FDD, each subframe is used in UL or DL transmission at the same time and at a different frequency. That is, subframes included in an FDD frame are divided into a UL subframe and a DL subframe in the frequency domain. UL transmission and DL transmission occupy different frequency bands and can be simultaneously performed.

A superframe header (SFH) can carry an essential system parameter and system configuration information. The SFH may be located in a first subframe in a superframe. The SFH may occupy last 5 OFDMA symbols of the first subframe. The SFH can be classified into a primary-SFH (P-SFH) and a secondary-SFH (S-SFH). The P-SFH may be transmitted in every superframe. Information transmitted on the S-SFH can be divided into 3 sub-packets. i.e., S-SFH SP1, S-SFH SP2, and S-SFH SP3. Each sub-packet can be transmitted periodically with a different periodicity. Information transmitted through the S-SFH SP1, the S-SFH SP2, and the S-SFH SP3 may be different from one another. The S-SFH SP1 may be transmitted with the shortest period, and the S-SFH SP3 may be transmitted with the longest period. The S-SFH SP1 includes information on network re-entry, and a transmission period of the S-SFH SP1 may be 40 ms. The S-SFH SP2 includes information on initial network entry and network discovery, and a transmission period of the S-SFH SP2 may be 80 ms. The S-SFH SP3 includes other important system information, and a transmission period of the S-SFH SP3 may be either 160 ms or 320 ms.

One OFDMA symbol includes a plurality of subcarriers, and the number of subcarriers is determined according to a fast Fourier transform (FFT) size. There are several types of subcarriers. A subcarrier type may include a data subcarrier for data transmission, a pilot subcarrier for various estimations, and a null carrier for a guard band and a DC carrier. A parameter for characterizing an OFDMA symbol includes BW, $N_{used}$, n, G, etc. BW denotes a nominal channel bandwidth. $N_{used}$ denotes the number of subcarriers in use (including a DC subcarrier). n denotes a sampling factor. This parameter is used to determine a subcarrier spacing and a useful symbol time together with BW and $N_{used}$. G denotes a ratio of a CP time and a useful time.

Table 1 below shows an OFDMA parameter. The OFDMA parameter of Table 1 can equally apply to the 802.163 frame structure of FIG. 4 symbols in the subframe. In addition, each frequency partition may include contiguous/localized and/or distributed PRUs. Each frequency partition may be used for other purposes such as fractional frequency reuse (FFR).

The PRU is a basic physical unit for resource allocation, and includes Psc contiguous subcarriers and Nsym contiguous OFDMA symbols. Psc may be 18. Nsym may be the same as the number of OFDMA symbols included in one subframe. Accordingly, Nsym may be determined according to a subframe type. For example, when one subframe consists of 6 OFDMA symbols, the PRU can be defined with 18 subcarriers and 6 OFDMA symbols. A logical resource unit (LRU) is a basic logical unit for distributed and contiguous resource allocations.

A distributed logical resource unit (DLRU) can be used to obtain a frequency diversity gain. The DLRU includes a group of subcarriers distributed in one frequency partition. A minimum unit of constituting the DLRU may be tone-pairs that are pairs of a plurality of subcarriers. A downlink DLRU may be obtained by performing subcarrier permutation for the data subcarrier of a distributed resource unit (DRU). The DRU has the same size as the PRU. That is, the DRU may include the Psc subcarriers and the Nsym OFMDA symbols.

TABLE 1

| Channel bandwidth, BW(MHz) | | | 5 | 7 | 8.75 | 10 | 20 |
|---|---|---|---|---|---|---|---|
| Sampling factor, n | | | 28/25 | 8/7 | 8/7 | 28/25 | 28/25 |
| Sampling frequency, $F_s$(MHz) | | | 5.6 | 8 | 10 | 11.2 | 22.4 |
| FFT size, $N_{FFT}$ | | | 512 | 1024 | 1024 | 1024 | 2048 |
| Subcarrier spacing, Δf(kHz) | | | 10.94 | 7.81 | 9.77 | 10.94 | 10.94 |
| Useful symbol time $T_b$(μs) | | | 91.4 | 128 | 102.4 | 91.4 | 91.4 |
| G = ⅛ | Symbol time, $T_s$(μs) | | 102.857 | 144 | 115.2 | 102.857 | 102.857 |
| | FDD | Number of ODFMA symbols per 5 ms frame | 48 | 34 | 43 | 48 | 48 |
| | | Idle time(μs) | 62.857 | 104 | 46.40 | 62.857 | 62.857 |
| | TDD | Number of ODFMA symbols per 5 ms frame | 47 | 33 | 42 | 47 | 47 |
| | | TTG + RTG(μs) | 165.714 | 248 | 161.6 | 165.714 | 165.714 |
| G = 1/16 | Symbol time, $T_s$(μs) | | 97.143 | 136 | 108.8 | 97.143 | 97.143 |
| | FDD | Number of ODFMA symbols per 5 ms frame | 51 | 36 | 45 | 51 | 51 |
| | | Idle time(μs) | 45.71 | 104 | 104 | 45.71 | 45.71 |
| | TDD | Number of ODFMA symbols per 5 ms frame | 50 | 35 | 44 | 50 | 50 |
| | | TTG + RTG(μs) | 142.853 | 240 | 212.8 | 142.853 | 142.853 |
| G = ¼ | Symbol time, $T_s$(μs) | | 114.286 | 160 | 128 | 114.286 | 114.286 |
| | FDD | Number of ODFMA symbols per 5 ms frame | 43 | 31 | 39 | 43 | 43 |
| | | Idle time(μs) | 85.694 | 40 | 8 | 85.694 | 85.694 |
| | TDD | Number of ODFMA symbols per 5 ms frame | 42 | 30 | 38 | 42 | 42 |
| | | TTG + RTG(μs) | 199.98 | 200 | 136 | 199.98 | 199.98 |
| Number of Guard subcarriers | Left | | 40 | 80 | 80 | 80 | 160 |
| | Right | | 39 | 79 | 79 | 79 | 159 |
| Number of used subcarriers | | | 433 | 865 | 865 | 865 | 1729 |
| Number of PRU in type-1 subframe | | | 24 | 48 | 48 | 48 | 96 |

In Table 1, $N_{FFT}$ is smallest power of two greater than $N_{used}$. A sampling factor $F_s$ is floor (n·BW/8000)×8000, a subcarrier spacing Δf is $F_s/N_{FFT}$, a useful symbol time $T_b$ is 1/Δ, a CP time $T_g$ is G·$T_b$, an OFDMA symbol time $T_s$ is $T_b+T_g$, and a sampling time is $T_b/N_{FFT}$.

Each uplink subframe can be divided into 4 or less frequency partitions. Each frequency partition consists of at least one physical resource unit (PRU) across all available orthogonal frequency division multiple access (OFDMA)

A contiguous logical resource unit (CLRU) can be used to obtain a frequency selective scheduling gain. The CLRU includes a group of contiguous subcarriers in a resource allocated in a localized manner. The CLRU consists of a data subcarrier in a contiguous resource unit (CRU). The CRU has the same size as the PRU. The CLRU may be obtained by directly mapping the CRU. The CLRU may be divided into a subband LRU (hereinafter, referred to as SLRU) based on a subband (SB) CRU and a miniband LRU (hereinafter, referred to as NLRU) based on miniband (MB) CRU in accordance with the kind of the based CRU.

Figure 6:
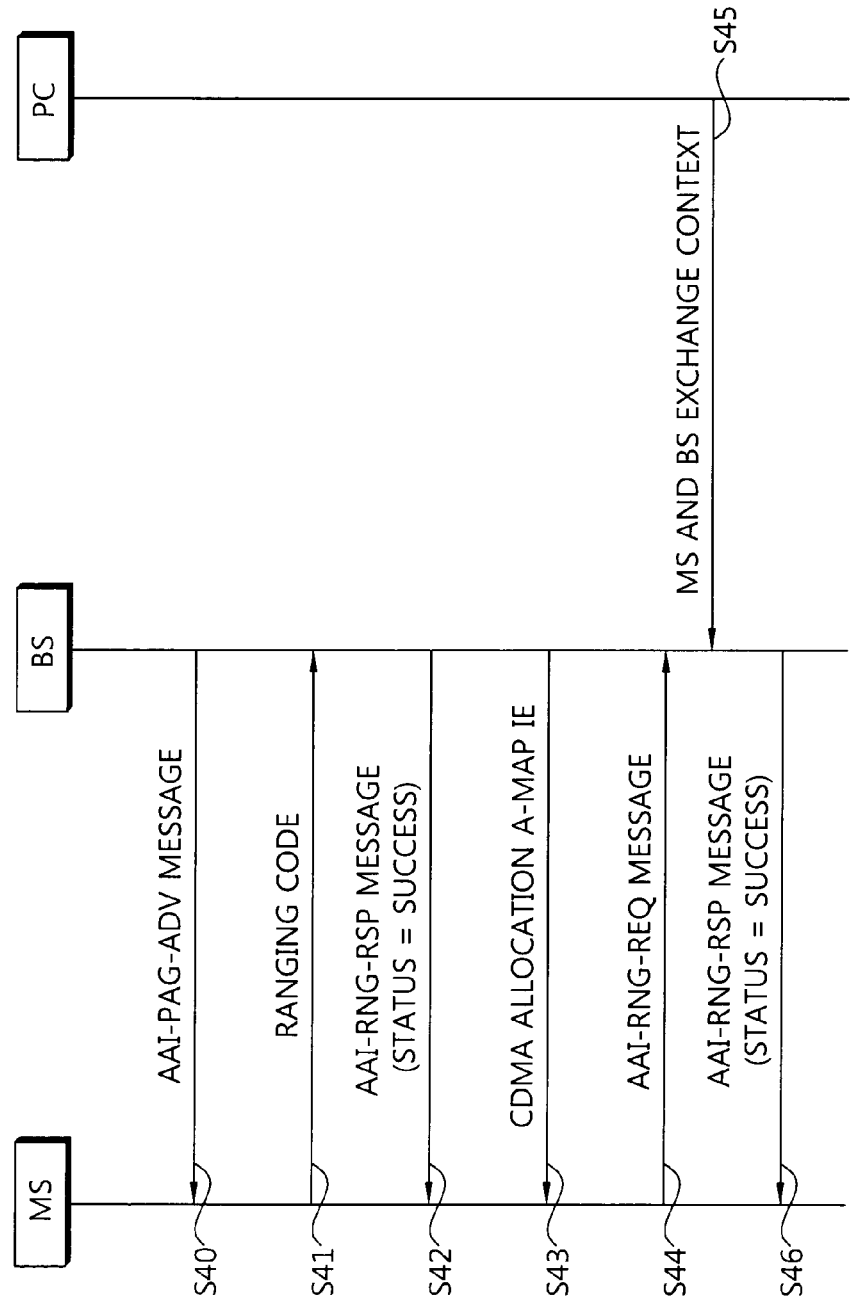
FIG. 6 shows an example of a ranging process in an idle mode of IEEE 802.16m.

FIG. 6 shows an example of a ranging process in an idle mode of IEEE 802.16m.

In step S40, a base station transmits a paging message AAI-PAG-ADV to a UE. The UE in the idle mode may receive the AAI-PAG-ADV message transmitted from the base station at a paging listening interval.

In step S41, the UE transmits a ranging code to the base station. The ranging code may be transmitted on a ranging channel. The ranging code may be one ranging code set randomly selected among ranging code sets.

In step S42, the base station transmits a ranging response massage (AAI-RNG-RSP) to the UE. The AAI-RNG-RSP message includes a ranging code transmitted by the UE. In this case, a ranging status of the AAI-RNG-RSP message may be 'success'. When the ranging status of the AAI-RNG-RSP message is 'continue', the UE may continuously transmit the ranging code to the base station until the AAI-RNG-RSP message of which the ranging status is 'success'.

In the case where the base station transmits the AAI-RNG-RSP message of which the ranging status is 'success' to the UE, in step S43, the base station transmits a CDMA allocation A-MAP information element (IE) to the UE. The UE may receive a bandwidth required for transmitting a ranging request message (AAI-RNG-REQ) to the base station through the CDMA allocation A-MAP IE.

In step S44, the UE transmits the AAI-RNG-REQ message to the UE. In this case, the UE may transmit the AAI-RNG-REQ through a resource allocated through the received CDMA allocation A-MAP IE.

In step S45, the base station and a paging controller (PC) exchange contexts of the UE and the base station.

In step 46, the base station transmits the AAI-RNG-RSP message of which the ranging status is 'success' to the UE. As a result, the ranging process ends.

A bandwidth request (BR) means a mechanism which notifies a case where the UE requires UL bandwidth allocation, to the base station. The UE may perform a contention-based random access bandwidth request by using a BR preamble sequence and an optional quick access message transmitted on a bandwidth request channel (BRCH). Further, the UE may perform the bandwidth request by using any one of a standalone BR carried through a BR signaling header, a piggybacked BR carried through a piggybacked bandwidth request extended header (PBREH), or a BR carried through a primary fast feedback channel (PFBCH).

The bandwidth request may be generally performed through a process of 3 steps or 5 steps. The 3-step bandwidth request process is to perform a fast bandwidth request, and the 5-step bandwidth request process is to more stably perform a contention-based bandwidth request process. The 5-step bandwidth request process is general, but if necessary, the 3-step bandwidth request process may be performed when the fast bandwidth request is required. The base station or the UE may determine whether the bandwidth request is performed through any bandwidth request process.

Figure 7:
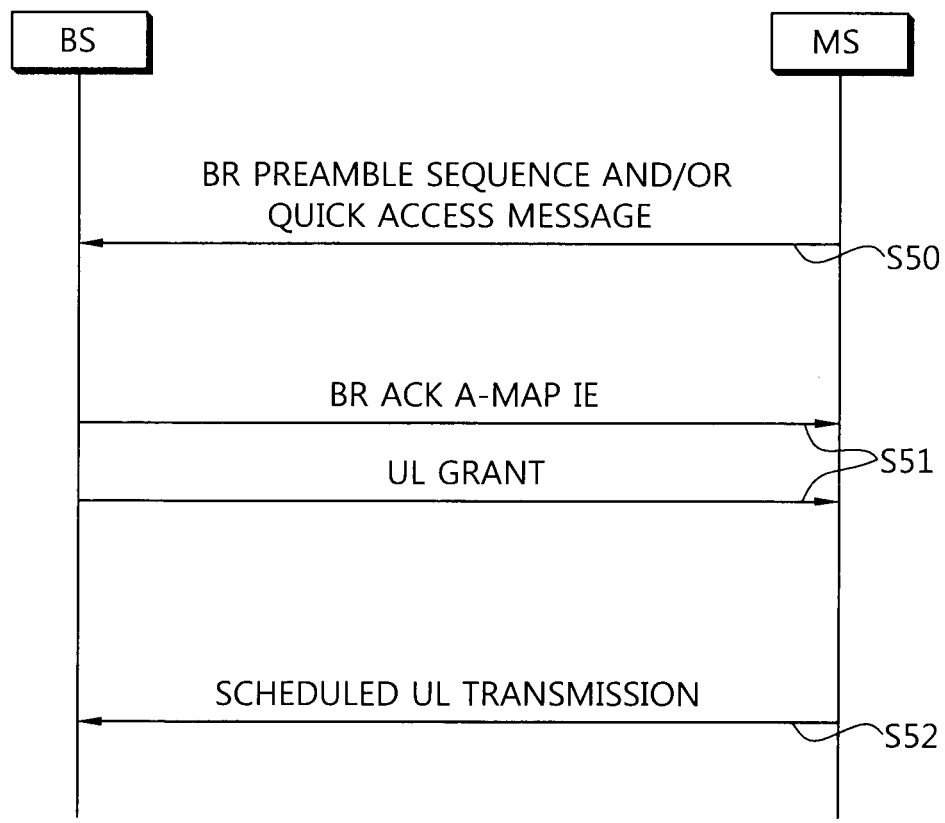
FIG. 7 shows an example of a 3-step bandwidth request process.

FIG. 7 shows an example of a 3-step bandwidth request process.

In step S50, the UE transmits the BR preamble sequence and/or the quick access message to the base station in a randomly selected BR opportunity. The quick access message may include at least one of UE addressing, a size of a requesting bandwidth, an uplink transmission power report, and a quality of service (QoS) identifier. The UE may determine whether to transmit only the BR preamble sequence or whether to transmit both the BR preamble sequence and the quick access message.

The base station detects at least one BR preamble sequence, and when the base station does not grant a UL resource by the CDMA allocation CDMA and the like, in step S51, the base station transmits at least one BR-acknowledgement (ACK) A-MAP IE to the UE. Each UE tries to decode the BR-ACK A-MAP IE after transmitting the BR preamble sequence. The BR-ACK A-MAP IE indicates 1) a decoding status of each BR opportunity, 2) a BR preamble sequence correctly received in the BR opportunity granted by the corresponding BR-ACK A-MAP IE, and 3) a decoding status of the quick access message for each BR preamble sequence correctly received granted by the corresponding BR-ACK A-MAP IE. The BR-ACK A-MAP IE may indicate any one of an ACK indicating that the base station successfully receives the BR preamble sequence, or a non-acknowledgement (NACK) indicating that the base station does not successfully receive the BR preamble sequence. Further, the base station transmits a UL grant for UL transmission of the UE to the UE together.

In step S52, the UE performs the scheduled UL transmission. In this case, information on an additional bandwidth request may be transmitted to the base station.

Figure 8:
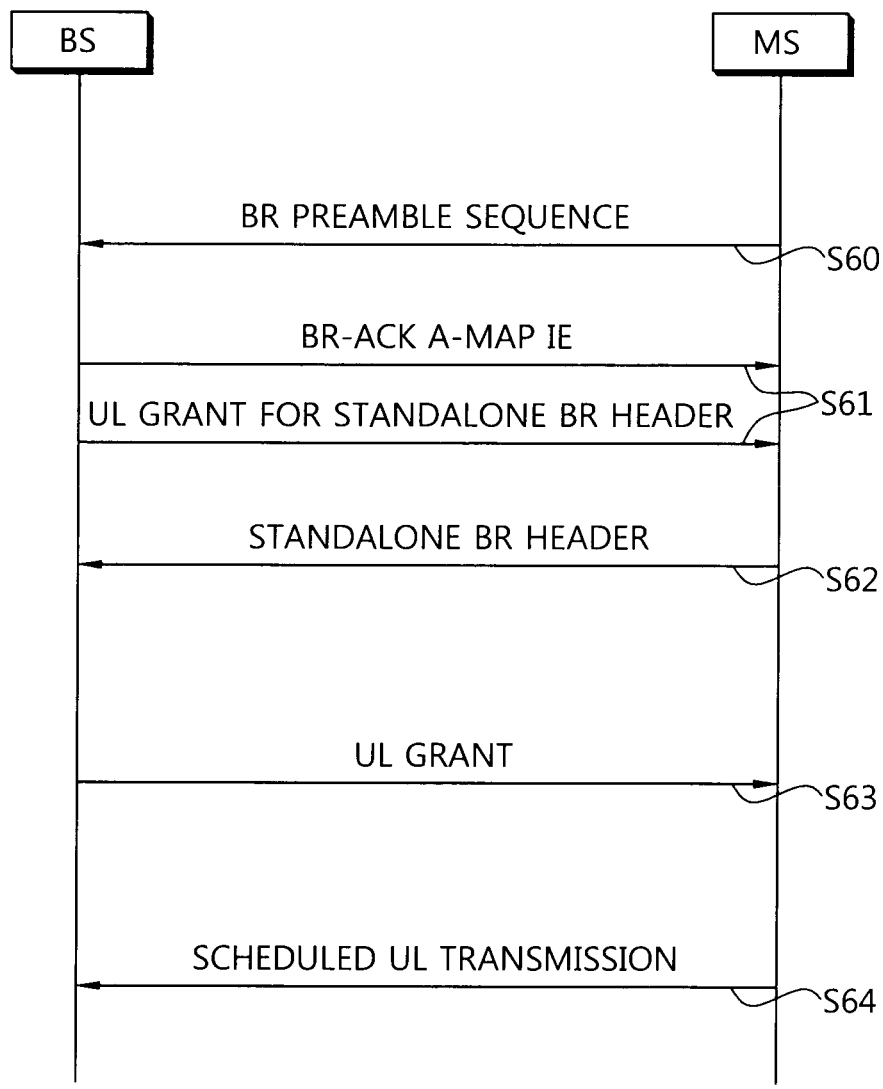
FIG. 8 shows an example of a 5-step bandwidth request process.

FIG. 8 shows an example of a 5-step bandwidth request process.

In step S60, the UE transmits the BR preamble sequence to the base station. The UE may select any BR preamble sequence among 24 BR preamble sequences.

The base station detects at least one BR preamble sequence, and when the base station does not grant a UL resource by the CDMA allocation CDMA and the like, in step S61, the base station transmits at least one BR-ACK A-MAP IE to the UE. Further, the base station transmits an UL grant for the standalone BR header to the UE together.

In step S62, the UE transmits the standalone BR header to the base station through the UL resource allocated by the UL grant.

Table 2 shows an example of a BR with station identifier (STID) header to be transmitted in step S62.

TABLE 2

| Field | Size (bits) | Description |
| --- | --- | --- |
| BR with STID ( ) { | | |
| FID | 4 | Flow Identifier. Set to 0010. |
| Type | 5 | MAC signaling header type = 0b00000 |
| Length | 3 | Indicates the length of the signaling header in bytes. |
| BR Size | 19 | Aggregated bandwidth request size in bytes |
| BR FID | 4 | The FID for which UL bandwidth is requested. |
| STID | 12 | STID of the AMS that requests UL bandwidth. |
| Reserved | 1 | Reserved. This field shall be filled by 0. |
| } | | |

Table 3 shows an example of a BR without STID header to be transmitted in step S62.

TABLE 3

| Field | Size (bits) | Description |
|---|---|---|
| BR without STID ( ) { | | |
| FID | 4 | Flow Identifier. Set to 0010. |
| Type | 5 | MAC signaling header type = 0b00001 |
| Length | 3 | Indicates the length of the signaling header in bytes. |
| BR Type | 1 | Indicates whether the requested bandwidth is incremental or aggregate: 0: aggregate 1: incremental |
| BR Size | 19 | Bandwidth request size in bytes. |
| BR FID | 4 | The FID for which UL bandwidth is requested. |
| Reserved | 1 | Shall be filled by 0. |
| } | | |

In step S63, the base station transmits a UL grant for the UL transmission of the UE to the UE.

In step S64, the UE performs the scheduled UL transmission. In this case, information on an additional bandwidth request may be transmitted to the base station.

The above 5-step bandwidth request process may be independently performed, or preformed by a alternate bandwidth request process against a case where the 3-step bandwidth request process is failed.

When the UE does not receive the BR-ACK A-MAP IE or the UL grant for the transmitted message from the base station, the UE may wait up to an end time of a predetermined period and then perform the bandwidth request process all over again. The predetermined period may vary according to a QoS parameter such as a scheduling type or a priority. When the bandwidth request process is performed and then an additional bandwidth is immediately allocated, the base station needs not to separately transmit the BR-ACK A-MAP IE.

A plurality of BR preamble sequences may be classified into a 3-step BR preamble sequence and a 5-step BR preamble sequence according to a usage. Information for classifying the 3-step BR preamble sequence and the 5-step BR preamble sequence or an index of the classified BR preamble sequence may be pre-designated or broadcasted. For example, when 19 BR preamble sequences are usable, the base station may assign 17 sequences as the 5-step BR preamble sequence, and assign two remaining sequences as the 3-step BR preamble sequence. In addition, the assigned BR preamble sequences may be broadcasted to the UE.

Figure 9:
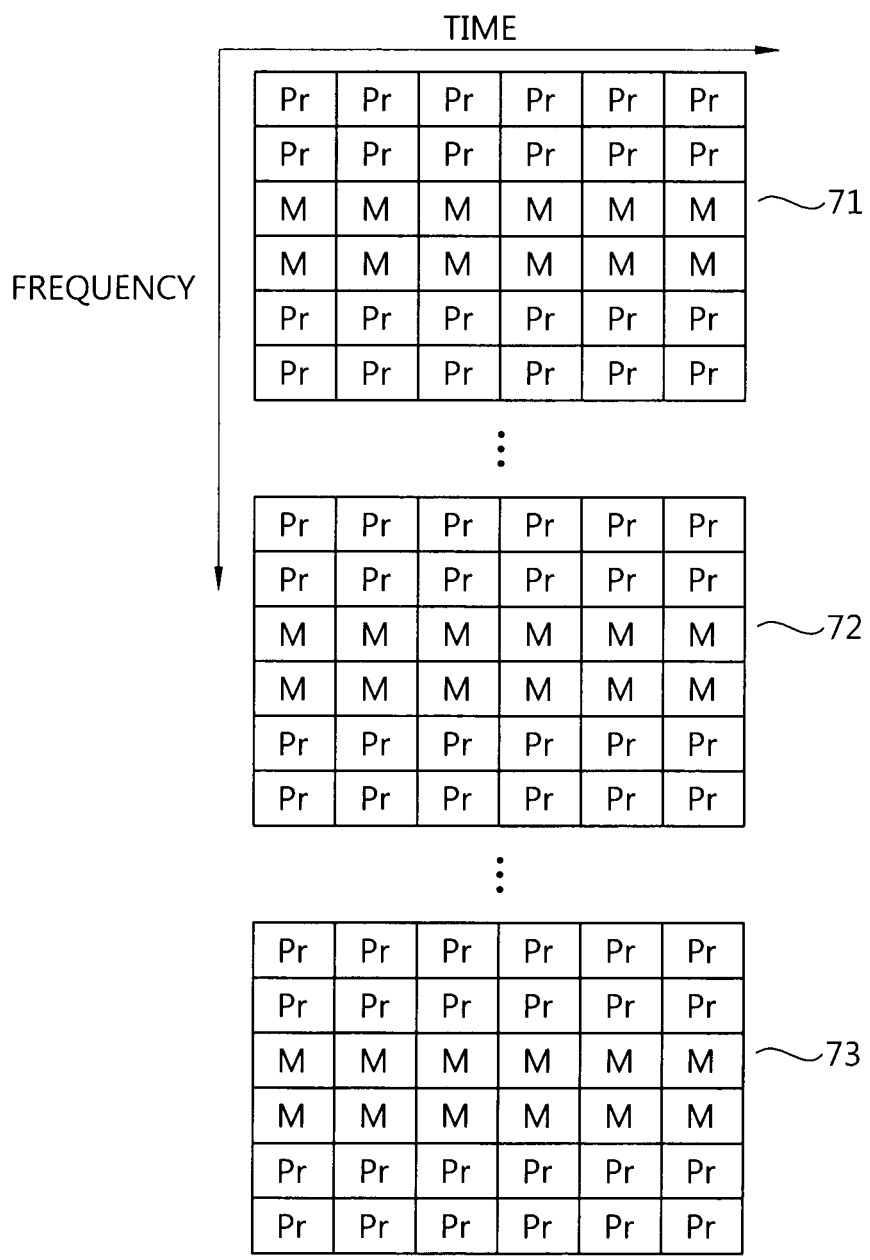
FIG. 9 shows an example of an uplink resource used in a BRCH.

FIG. 9 shows an example of an uplink resource used in a BRCH.

Bandwidth request information is transmitted on the BRCH by the contention-based random access method. The BRCH includes a resource for transmitting a bandwidth request preamble and an optional quick access massage by the UE. Each BRCH indicates one BR opportunity. The uplink resource allocated to the BRCH includes at least one bandwidth request tile (BR tile). The BR tile is an allocation unit of a resource allocated to the BRCH. The BR tile may be a physical resource allocation unit, or a logical BR resource allocation unit.

The BR tiles 71, 72, and 73 are defined by six subcarriers and six OFDMA symbols. Further, each BRCH may include three distributed BR tiles 71, 72, and 73. That is, at least one of other tiles may be disposed between a first BR tile 71 and a second BR tile 72 and/or the second BR tile 72 and a third BR tile 73. The BR tiles 71, 72, and 73 are distributively disposed in a frequency domain to acquire frequency diversity. The number of OFDMA symbols in a time domain included in the BR tile and/or the number of subcarriers in the frequency domain are just exemplified, and are not limited. The number of OFDMA symbols included in the BR tile may vary according to the number of OFDMA symbols included in a subframe. For example, when the number of OFDMA symbols included in one subframe is 6, the number of OFDMA symbols included in the BR tile may be 6.

The OFDMA symbol means a duration in the time domain, and is not necessarily limited to an OFDM/OFDMA-based system. The OFDMA symbol may be called another name such as a symbol duration, and the spirit of the present invention is not limited to a specific multiple access scheme by the name called the OFDMA symbol. Further, the subcarrier means an allocation unit in the frequency domain, and here, one subcarrier is used as a unit, but a subcarrier set unit may be used.

Each of the BR tiles 71, 72, and 73 may be divided into a preamble portion Pr and a data portion M. Each of the BR tiles 71, 72, and 73 transmits the same data. The preamble portion Pr may be configured by four subcarriers and six OFDMA symbols. The preamble portion Pr may transmit an orthogonal BR preamble. The data portion M may be configured by two consecutive subcarriers and six OFDMA symbols. The data portion M may transmit a quick access message during the 3-step bandwidth request process. The quick access message may include an STID of 12 bits, and a pre-defined BR index of 4 bits. The STID is information which is allocated to the UE by the base station in order to identify the UE within a base station area in a situation such as network entry, and each UE registered in the network has an allocated STID. A specific STID may remain for a usage such as broadcasting, multicasting, or ranging. In the case where the UE does not perform the 3-step bandwidth request process, the data portion M of the BR tile may not be used but remain. That is, the data portion M of the BR tile may be selectively transmitted.

As described above, generally, a network reentry procedure in the idle mode starts to transmit the ranging code on the ranging channel by the UE. During the network reentry, it is assumed that UL synchronization between the UE and the base station and power control are not performed. Accordingly, the ranging code needs to have a function to correct a synchronization error, and consider a cross-correlation and the like with another code. In general, a pseudo-noise (PN) code or a Zadoff-Chu (ZC) code is used as the ranging code, and particularly in the OFDMA system, the ZC code which has an excellent synchronization performance and has a relatively small peak-to-average power ratio (PAPR) may be used as the ranging code. The ZC code uses a resource having a relatively large size which is continuously allocated in a frequency axis in order to secure performance. For example, in IEEE 802.16m, a ranging channel to which the ZC code used as the ranging code is transmitted may be configured by eight LRUs.

Meanwhile, due to a characteristic of a machine-to-machine (M2M) application, possibility that there is no mobility of an M2M device is very high. That is, possibility that a device will be the M2M device communicates at a fixed position is very high. In the case where the position of the M2M device is fixed, a channel environment between the base station and the M2M device is uniform. Accordingly, a method of performing ranging by using a channel used by a pre-synchronized UE other than an existing ranging channel may be proposed. For example, a method of performing ranging by using the BRCH by the M2M device may be proposed. In this case, the M2M device may perform ranging by using radio resources less than radio resources which the existing ranging channel occupies. Since the base station and the M2M device are pre-synchronized, an orthogonal code other than the ZC code may be used. Further, since the M2M device needs not to transmit the quick access message, the data portion within the BR tile may also be used for transmission of the orthogonal code for ranging. In this case, any one of 32 Hadamard codes having a length of 32 may be used.

Hereinafter, the method of performing the ranging according to embodiments of the present invention will be described.

Figure 10:
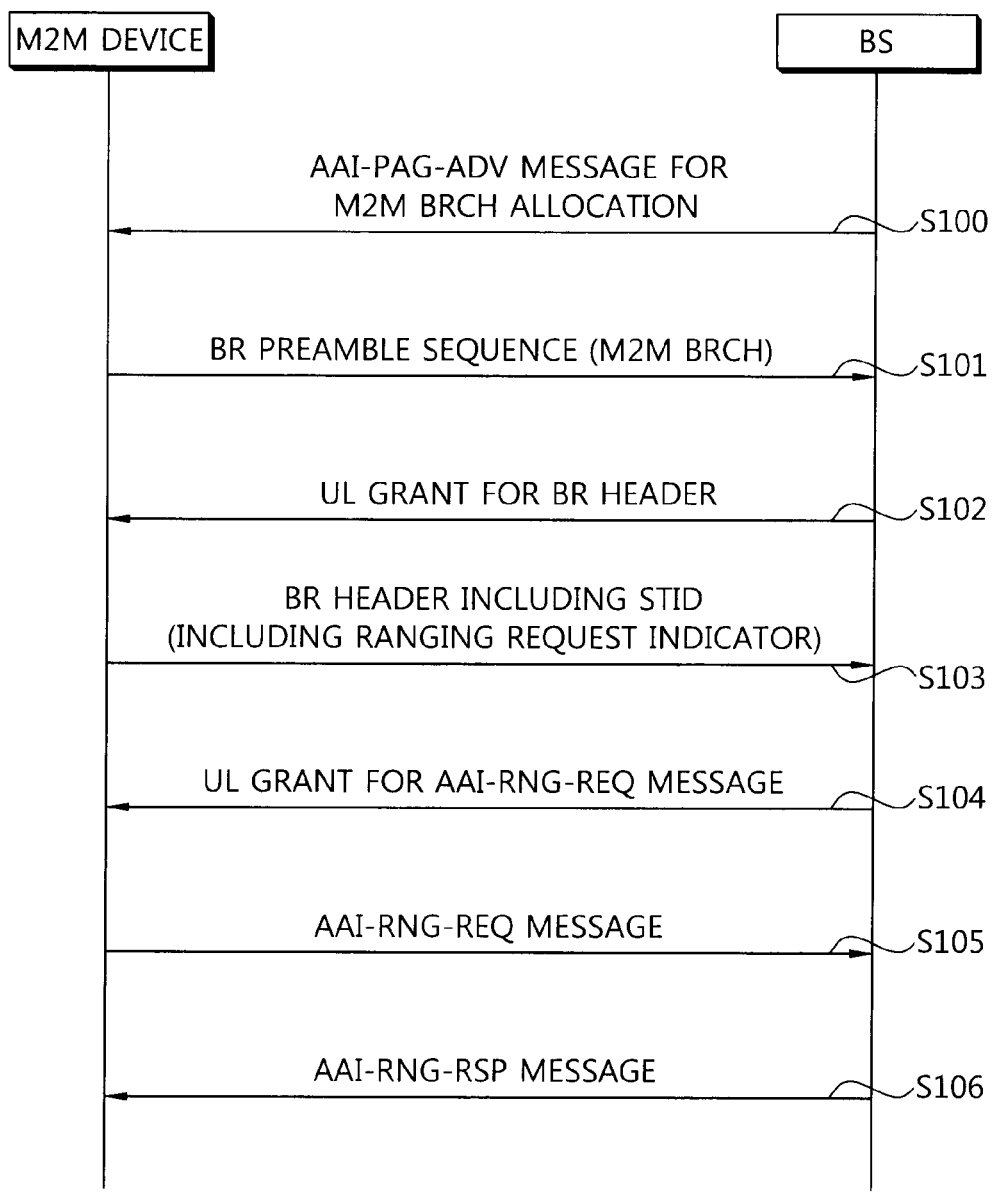
FIG. 10 shows an example of a method of performing ranging according to an embodiment of the present invention.

FIG. 10 shows an example of a method of performing ranging according to an embodiment of the present invention. The method of performing ranging of FIG. 10 is based on the 5-step bandwidth request process of FIG. 8.

In step S100, the base station transmits the AAI-PAG-ADV message to the M2M device. The base station may allocate an M2M BRCH which is a BRCH for the M2M device through the AAI-PAG-ADV message.

In step S101, the M2M device transmits a BR preamble sequence on the M2M BRCH.

In step S102, the base station detects the BR preamble sequence transmitted from the M2M device, and transmits a UL grant for transmission of the BR header of the of the M2M device to the M2M device. As a result, the UL grant for transmission of the BR header may be allocated to the M2M device.

In step S103, the M2M device transmits the BR with STID header to the base station. The M2M device transmits the BR with STID header to the base station to receive the resource for transmission of the AAI-RNG-REQ message during the network reentry. When the M2M device transmits the BR with STID header to the base station as described in Table 2, the base station may allocate a UL resource of maximum 19 bytes to the M2M device through the UL grant. However, since a size of the AAI-RNG-REQ message to be transmitted by the M2M device is 24 bytes, the resource for transmission of the AAI-RNG-REQ message may not be allocated through the BR with STID header of Table 2. Accordingly, according to an embodiment of the present invention, the BR with STID header may include a ranging request indication. Table 4 shows an example of the BR with STID header including the ranging request indication according to an embodiment of the present invention.

TABLE 4

| Field | Size (bits) | Description |
|---|---|---|
| BR with STID ( ) { | | |
| FID | 4 | Flow Identifier. Set to 0010. |
| Type | 5 | MAC signaling header type = 0b00000 |
| Length | 3 | Indicates the length of the signaling header in bytes. |
| BR Size | 19 | Aggregated bandwidth request size in bytes |
| BR FID | 4 | The FID for which UL bandwidth is requested. |
| STID | 12 | Padded to 0. |
| Ranging Request Indication | 1 | Indicates that the M2M device transmits the AAI-RNG-REQ message. |
| } | | |

Referring to Table 4, the BR with STID header includes a ranging request indication of 1 bit. The ranging request indication indicates that the M2M device transmits the AAI-RNG-REQ message.

Table 5 shows another example of the BR with STID header according to an embodiment of the present invention.

TABLE 5

| Field | Size (bits) | Description |
|---|---|---|
| BR with STID ( ) { | | |
| FID | 4 | Flow Identifier. Set to 0010. |
| Type | 5 | MAC signaling header type = 0b00000 |
| Length | 3 | Indicates the length of the signaling header in bytes. |
| BR Size | 19 | Aggregated bandwidth request size in bytes |
| BR FID | 4 | The FID for which UL bandwidth is requested. |
| STID | 12 | When BR type is 1, set to 0. |
| BR Type | 1 | Set to 0 or 1. 0: Indicates a bandwidth request process of a general human-type communication (HTC) device. 1: Indicates a network reentry process of M2M device. When BR type is set to 1, STID is set to 0 and base station ignores the STID. |
| } | | |

Referring to Table 5, the BR with STID header may include a BR Type field. When a value of the BR Type field is 0, the BR header indicates the bandwidth request process of a general UE. When a value of the BR Type field is 1, the BR header indicates the network reentry process of the M2M device. In this case, the STID is set to 0, and the STID set to 0 may implicitly indicate the ranging request indication.

Referring back to FIG. 10, in step S104, the base station verifies the ranging request indication within the BR with STID header transmitted by the M2M device, and transmits the UL grant for transmission of the AAI-RNG-REQ message to the M2M device. The UL grant may be the CDMA allocation A-MAP IE. As a result, the UL resource for transmission of the AAI-RNG-REQ message of the M2M device may be allocated.

In step S105, the M2M device transmits the AAI-RNG-REQ message to the base station.

In step S106, the base station transmits the AAI-RNG-RSP message as a response to the AAI-RNG-REQ message to the M2M device.

Meanwhile, in FIG. 10, the M2M device is exemplified to transmit the BR with STID header, but is not limited thereto. The M2M device transmits the BR without STID header to receive the UL resource for transmission of the AAI-RNG-REQ message. Table 6 shows an example of the BR without STID header including the ranging request indication according to an embodiment of the present invention.

TABLE 6

| Field | Size (bits) | Description |
|---|---|---|
| BR without STID ( ) { | | |
| FID | 4 | Flow Identifier. Set to 0010. |
| Type | 5 | MAC signaling header type = 0b00001 |
| Length | 3 | Indicates the length of the signaling header in bytes. |
| BR Type | 1 | Indicates whether the requested bandwidth is incremental or aggregate: 0: aggregate 1: incremental |
| BR Size | 19 | Bandwidth request size in bytes |
| BR FID | 4 | The FID for which UL bandwidth is requested. |
| Ranging Request Indication | 1 | Indicates that the M2M device transmits the AAI-RNG-REQ message. |
| Reserved | 3 | Shall be filled by 0 |
| } | | |

Figure 11:
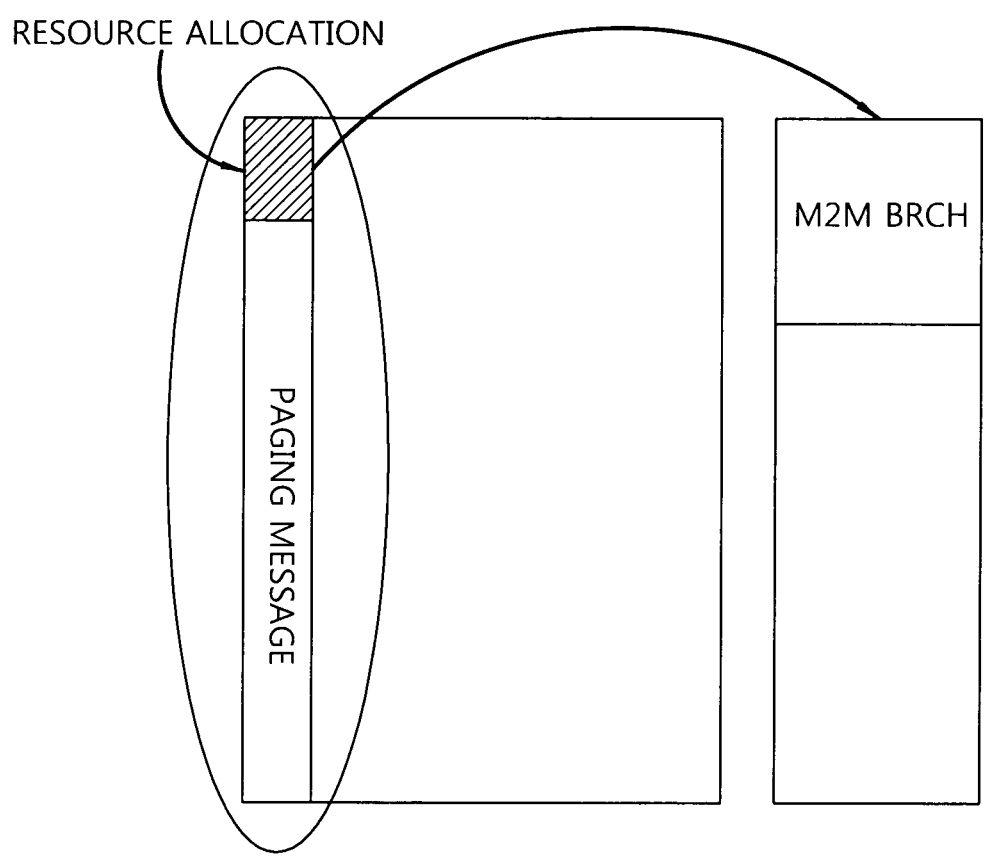
FIG. 11 shows allocation of an M2M BRCH for the network reentry through a paging message.

FIG. 11 shows allocation of an M2M BRCH for the network reentry through a paging message. In step S100 of FIG. 10, the base station may allocate an M2M BRCH which is a BRCH for the M2M device through the AAI-PAG-ADV message. However, the present invention is not limited thereto, and the base station may allocate the M2M BRCH to the M2M device through a system configuration descriptor (AAI-SCD) message.

Figure 12:
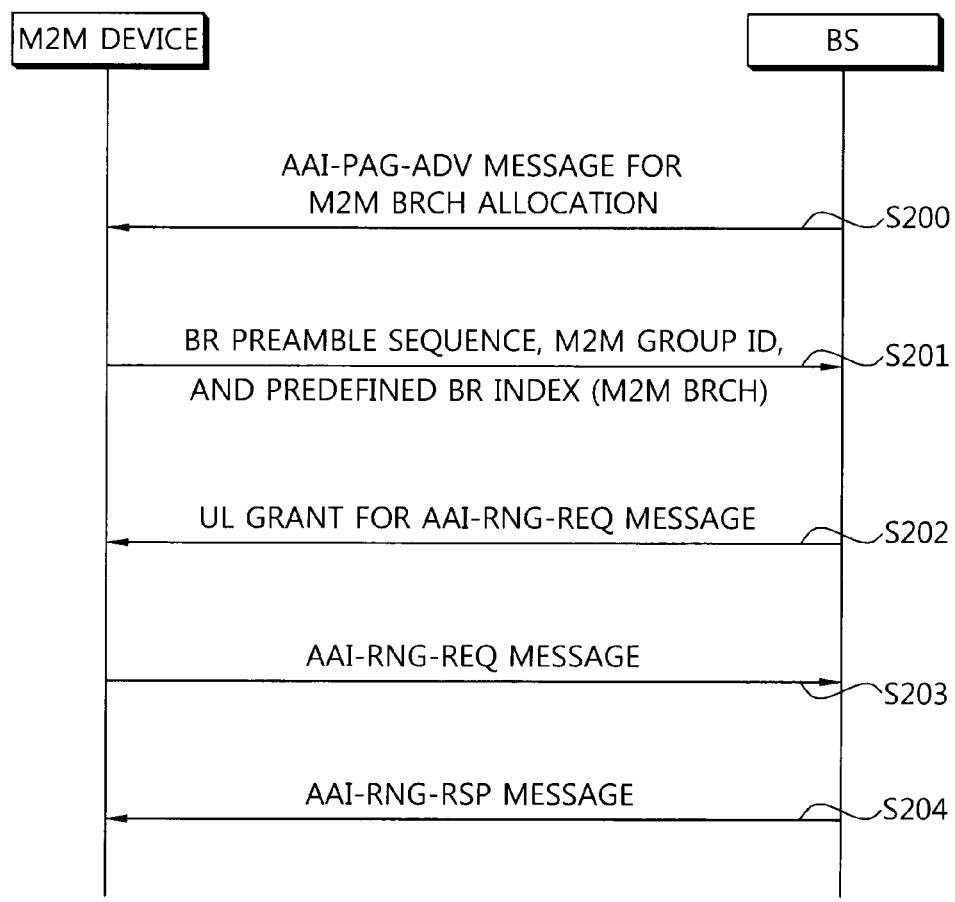
FIG. 12 shows another example of a method of performing ranging according to an embodiment of the present invention.

FIG. 12 shows another example of a method of performing ranging according to an embodiment of the present invention. The method of performing ranging of FIG. 12 is based on the 3-step bandwidth request process.

In step S200, the base station transmits the AAI-PAG-ADV message to the M2M device. The base station may allocate an M2M BRCH which is a BRCH for the M2M device through the AAI-PAG-ADV message.

In step S201, the M2M device transmits a BR preamble sequence, an M2M group ID, and a pre-defined BR index on the M2M BRCH. The M2M group ID may be 12 bits. The pre-defined BR index may be 4 bits. The M2M device may receive a UL resource for transmitting the AAI-RNG-REQ message by the pre-defined BR index.

Table 7 shows an example of pre-defined BR index parameters according to an embodiment of the present invention. The pre-defined BR index may be included in an AAI-DSA-REQ/RSP message or an AAI-DSC-REQ/RSP message.

TABLE 7

| Field | Size (bits) | Description |
| --- | --- | --- |
| Predefined BR Index parameter ( ) { | | |
| Number of predefined BR indexes (K) | 4 | Ranging: 0~15 |
| For (i=1 to K+1) { | | |
| Predefined BR Index | 4 | |
| BR Action | 2 | 0b00: ertPS service flow requests to resume to maximum sustained rate<br>0b01: aGP service flow requests to switch to Primary QoS parameters<br>0b10: BR<br>0b11: Network reentry |
| If (BR Action == 0b10) { | | |
| BR Size | 11 | Number of bytes requested by the predefined BR index |
| }<br>} | | |
| If (BR Action == 0b11) { | | |
| BR Size | | Indicates the number of bytes requested by the pre-defined BR index for transmission of the AAI-RNG-REQ message during network reentry. |
| }<br>} | | |

Referring to Table 7, the pre-defined BR index parameters may include a BR index for network entry and a BR action. When a value of a BR Action field is 0b10, the M2M device performs a bandwidth request process. When a value of the BR Action field is 0b10, the M2M device performs a network reentry process. In this case, a BR Size field indicates the number of bytes requested by the pre-defined BR index for transmission of the AAI-RNG-REQ message during the network reentry.

Referring back to FIG. 12, in step S202, the base station transmits an UL grant for transmission of the AAI-RNG-REQ message of the M2M device. The UL grant may be the CDMA allocation A-MAP IE. As a result, the UL resource for transmission of the AAI-RNG-REQ message of the M2M device may be allocated.

In step S203, the M2M device transmits the AAI-RNG-REQ message to the base station.

In step S204, the base station transmits the AAI-RNG-RSP message to the M2M device as a response to the AAI-RNG-REQ message.

Figure 13:
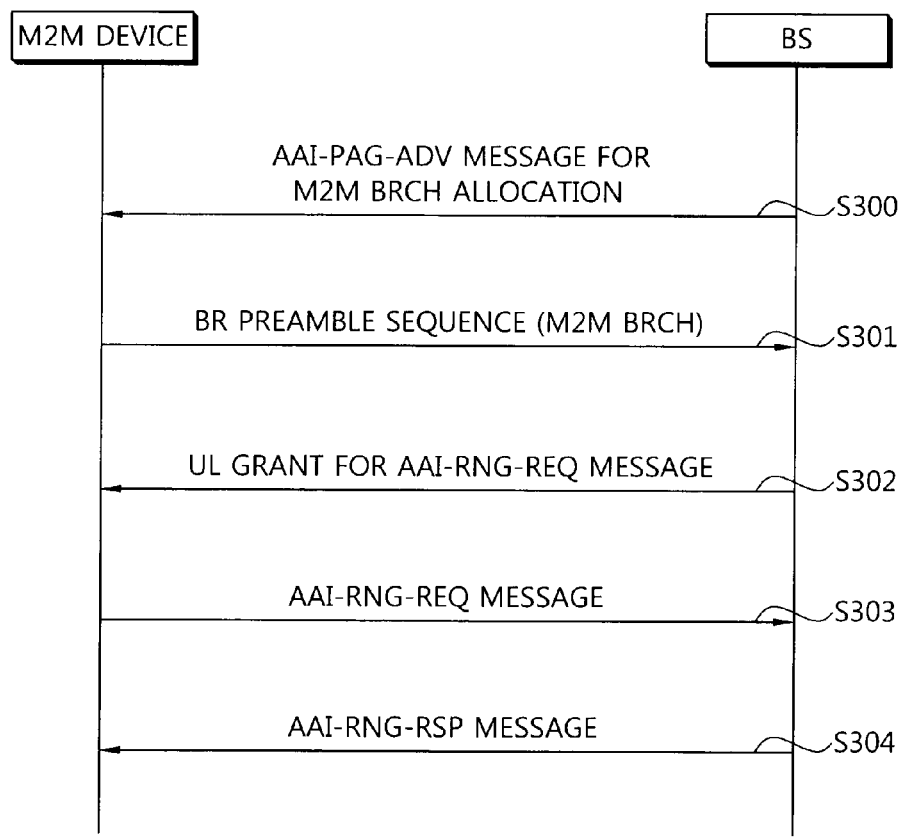
FIG. 13 shows another example of a method of performing ranging according to an embodiment of the present invention.

FIG. 13 shows another example of a method of performing ranging according to an embodiment of the present invention. The method of performing ranging of FIG. 13 simplifies the method of performing ranging of FIG. 10.

In step S300, the base station transmits the AAI-PAG-ADV message to the M2M device. The base station may allocate an M2M BRCH which is a BRCH for the M2M device through the AAI-PAG-ADV message.

In step S301, the M2M device transmits a BR preamble sequence on the M2M BRCH.

In step S302, the base station detects the BR preamble sequence transmitted by the M2M device, and transmits a UL grant for transmission of the AAI-RNG-REQ message to the M2M device. The UL grant may be the CDMA allocation A-MAP IE. As a result, the UL resource for transmission of the AAI-RNG-REQ message of the M2M device may be allocated.

In step S303, the M2M device transmits the AAI-RNG-REQ message to the base station.

In step S304, the base station transmits the AAI-RNG-RSP message to the M2M device as a response to the AAI-RNG-REQ message.

The method of performing ranging described in the above embodiment, the M2M BRCH used by the M2M device is allocated through the AAI-PAG-ADV message and the M2M device performs the ranging based on the allocated M2M BRCH. Hereinafter, a method of performing ranging based on the pre-allocated BRCH without using the M2M BRCH for the M2M device.

Figure 14:
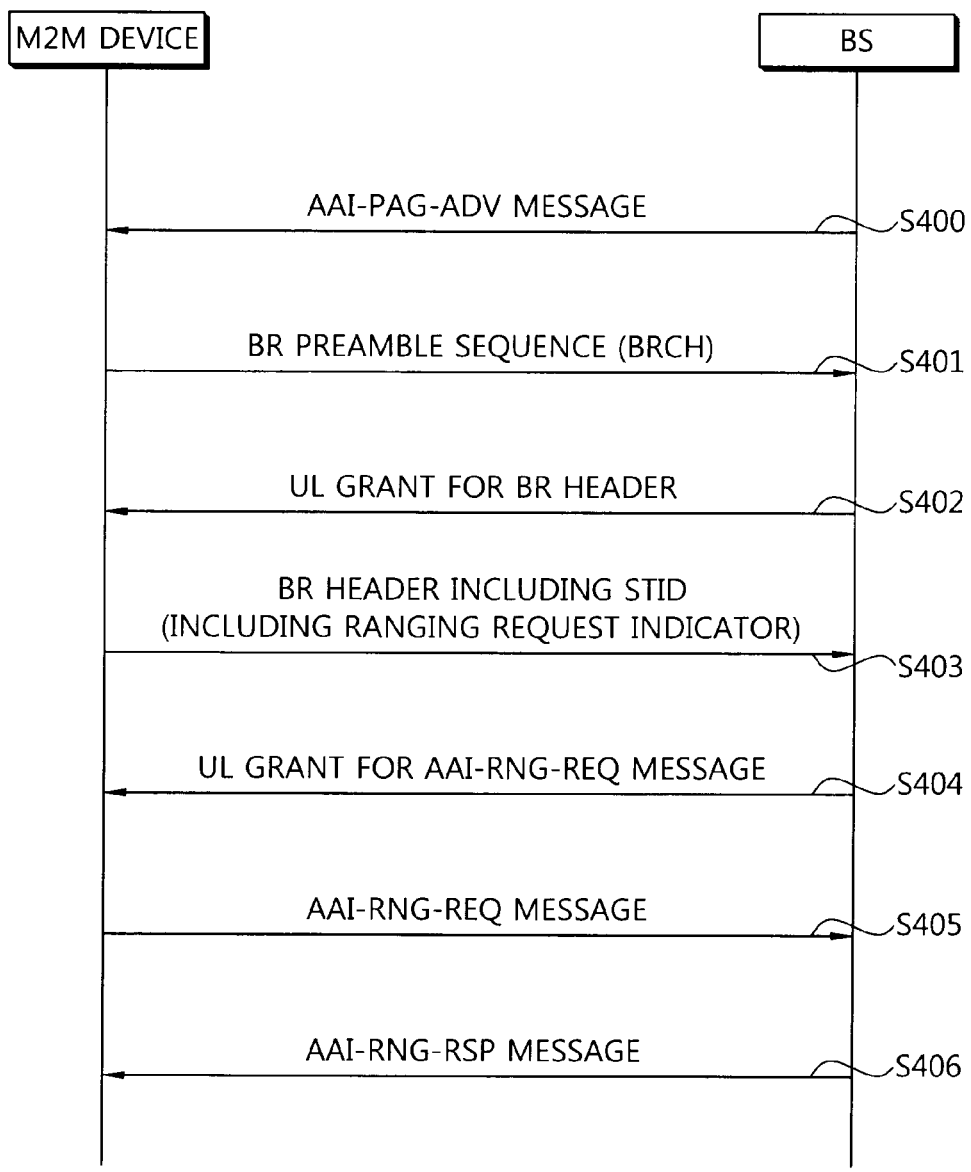
FIG. 14 shows another example of a method of performing ranging according to an embodiment of the present invention.

FIG. 14 shows another example of a method of performing ranging according to an embodiment of the present invention. The method of performing ranging of FIG. 14 is based on the 5-step bandwidth request process of FIG. 8.

In step S400, the base station transmits the AAI-PAG-ADV message to the M2M device.

In step S401, the M2M device transmits a BR preamble sequence on the BRCH.

In step S402, the base station detects the BR preamble sequence transmitted from the M2M device, and transmits a UL grant for transmission of the BR header of the of the M2M device to the M2M device. As a result, the UL grant for transmission of the BR header may be allocated to the M2M device.

In step S403, the M2M device transmits the BR with STID header to the base station. The M2M device transmits the BR with STID header to the base station to receive the resource for transmission of the AAI-RNG-REQ message during the network reentry. In this case, the BR with STID header may include a ranging request indication. The BR with STID header is as described in Table 4 or Table 5.

In step S404, the base station verifies the ranging request indication within the BR with STID header transmitted by the M2M device, and transmits a UL grant for transmission of the AAI-RNG-REQ message to the M2M device. The UL grant may be the CDMA allocation A-MAP IE. As a result, the UL resource for transmission of the AAI-RNG-REQ message of the M2M device may be allocated.

In step S405, the M2M device transmits the AAI-RNG-REQ message to the base station.

In step S406, the base station transmits the AAI-RNG-RSP message to the M2M device as a response to the AAI-RNG-REQ message.

Meanwhile, in FIG. 14, the M2M device is exemplified to transmit the BR with STID header, but is not limited thereto. The M2M device transmits the BR without STID header to receive the UL resource for transmission of the AAI-RNG-REQ message. The BR without STID header is as described in Table 6.

Figure 15:
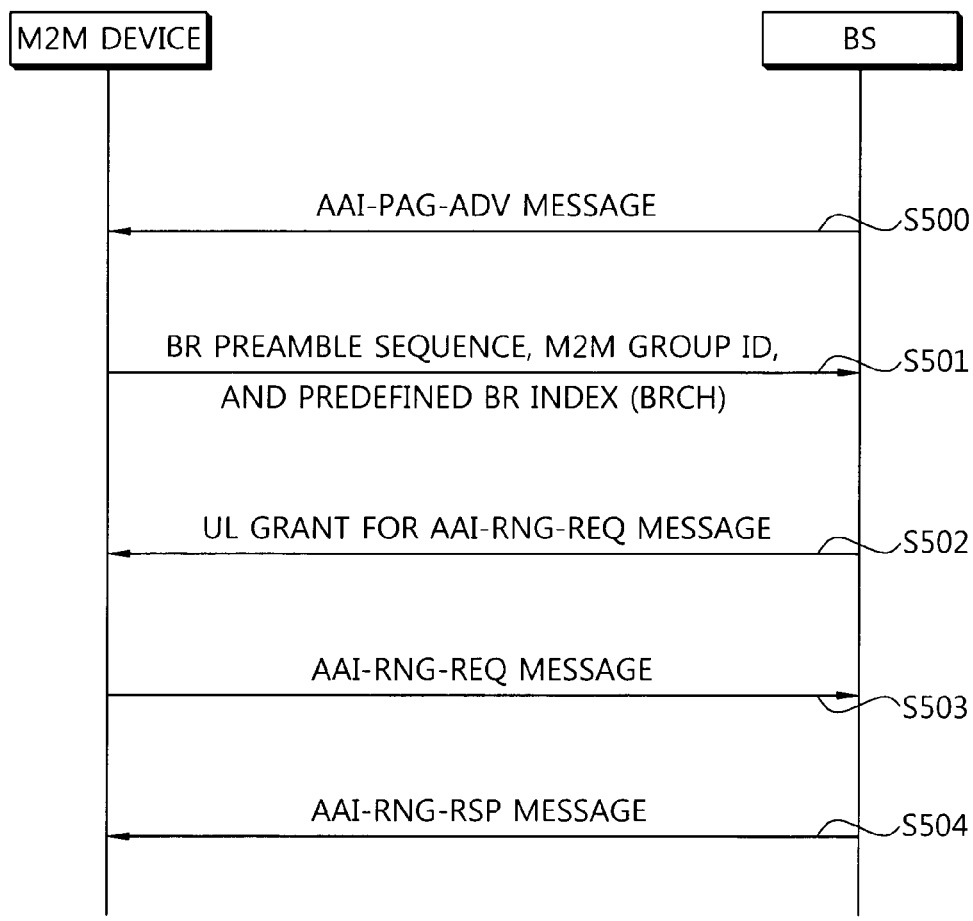
FIG. 15 shows another example of a method of performing ranging according to an embodiment of the present invention.

FIG. 15 shows another example of a method of performing ranging according to an embodiment of the present invention. The method of performing ranging of FIG. 15 is based on the 3-step bandwidth request process of FIG. 7.

In step S500, the base station transmits the AAI-PAG-ADV message to the M2M device.

In step S501, the M2M device transmits a BR preamble sequence, an M2M group ID, and a pre-defined BR index onto the BRCH. The M2M group ID may be 12 bits. The pre-defined BR index may be 4 bits. The M2M device may receive a UL resource for transmitting the AAI-RNG-REQ message by the pre-defined BR index. The pre-defined BR index is as described in Table 7.

In step S502, the base station transmits a UL grant for transmission of the AAI-RNG-REQ message of the M2M device to the M2M device. The UL grant may be the CDMA allocation A-MAP IE. As a result, the UL resource for transmission of the AAI-RNG-REQ message of the M2M device may be allocated.

In step S503, the M2M device transmits the AAI-RNG-REQ message to the base station.

In step S504, the base station transmits the AAI-RNG-RSP message to the M2M device as a response to the AAI-RNG-REQ message.

Hereinafter, an example of the AAI-PAG-ADV message transmitted to the M2M device for performing ranging of the M2M device, as described above according to embodiments of the present invention, will be described.

Table 8 shows an example of the AAI-PAG-ADV message according to an embodiment of the present invention.

TABLE 8

| Field | Size (bits) | Value/Description | Condition |
|---|---|---|---|
| Paging_Group_IDs bitmap | L | Indicate that the paging information for the corresponding paging group is included in AAI-PAG-ADV message The length of Paging_Group_IDs bitmap is same as Num_PGIDs in PGID-Info message. 0: the paging information for the corresponding PGID is not included 1: the paging information for the corresponding PGID is included | L equals the Num_PGIDs in PGID-Info message |
| For (i=0; i<M; i++) { | | | M equals the number of Bits in Paging_Group_IDs bitmap whose bit is set to 1. |
| M2M Group ID Bitmap | N | Indicate that the paging information for the corresponding M2M group is included in AAI-PAG-ADV message. 0: the paging information for the corresponding M2M group is not included 1: the paging information for the corresponding M2M group is included. | N equals the number of the M2M Group. |
| For (i=0; i<N; i++) { | | | N equals the number of bits in M2M group bitmap whose bit is set to 1. |
| UL Basic Assignment A-MAP IE offset | | Indicate the location of the UL Basic Assignment A-MAP IE for transmission of the AAI-RNG-REQ message. This parameter is only used for fixed M2M devices which were paged in AAI-PAG-ADV message. The resource of the paged M2M device within the M2M group is allocated in sequence. The paged M2M device receives a resource for transmission of the own AAI-RNG-REQ message in the order coinciding with the own paged order. That is, offset information per M2M group is included only once. | Shall be presented when the Num_Fixed_M2M devices is not equal to zero. |
| For (j=0; j< Num_Fixed M2M devices; j++) { | | Num_Fixed M2M devices indicates the number of paged fixed M2M devices in a corresponding M2M group. | |
| Deregistration Identifier | 18 | Used to indicate Deregistration ID for the Fixed M2M device to be paged. | |
| } | | | |
| For (k=0; k< Num_Non_Fixed_M2M devices; k++) { | | Num_Non_Fixed M2M devices indicates the number of paged Non fixed M2M devices in a corresponding M2M group. | |

TABLE 8-continued

| Field | Size (bits) | Value/Description | Condition |
|---|---|---|---|
| Deregistration Identifier | 18 | Used to indicate Deregistration ID for the Fixed M2M device to be paged. | |
| } } | | | |
| For (l=0;l<Num_AMSs; l++) { | | Num_AMSs indicates the number of paged AMSs in a corresponding paging group 1 . . . 32 | |
| Deregistration Identifier | 18 | Used to indicate Deregistration ID for the MS to be paged. | Present if the S-SFH Network Configuration bit == 0b0 |
| . . . | | | |
| Action code | 1 | Used to indicate the purpose of the AAI-PAG-ADV message 0b0: perform network reentry 0b1: perform ranging for location update | |
| } } | | | |

Table 9 shows an example of the AAI-PAG-ADV message according to an embodiment of the present invention.

TABLE 9

| Field | Size (bits) | Value/Description | Condition |
|---|---|---|---|
| Paging_Group_IDs bitmap | L | Indicate that the paging information for the corresponding paging group is included in AAI-PAG-ADV message The length of Paging_Group_IDs bitmap is same as Num_PGIDs in PGID-Info message. 0: the paging information for the corresponding PGID is not included 1: the paging information for the corresponding PGID is included | L equals the Num_PGIDs in PGID-Info message |
| For (i=0; i<M; i++) { | | | M equals the number of Bits in Paging_Group_IDs bitmap whose bit is set to 1. |
| M2M Group ID Bitmap | N | Indicate that the paging information for the corresponding M2M group is included in AAI-PAG-ADV message. 0: the paging information for the corresponding M2M group is not included 1: the paging information for the corresponding M2M group is included. | N equals the number of the M2M Group. |
| For (i=0; i<N; i++) { | | | N equals the number of Bits in M2M group bitmap whose bit is set to 1. |
| For (j=0; j< Num_M2M devices; j++) { | | Num_M2M devices indicates the number of paged M2M devices in a corresponding M2M group. | |
| Deregistration Identifier } | 18 | Used to indicate Deregistration ID for the M2M device to be paged. | |
| M2M device Bitmap | | Bitmap to indicate scheduled M2M devices in a group. The size of the bitmap is equal to the paged devices in the M2M group of the AAI-PAG-ADV message. 0b0: M2M device not allocated in this AAI superframe 0b1: M2M device allocated in this AAI superframe | |

TABLE 9-continued

| Field | Size (bits) | Value/Description | Condition |
|---|---|---|---|
| UL Basic Assignment A-MAP IE offset | | Indicates the start of the UL Basic Assignment A-MAP IE used for allocations of AAI-RNG-REQ message. The resource set to 1 is allocated in sequence in the M2M device Bitmap. That is, offset information per M2M group is included only once. | Present in the case where at least one among bits of the M2M device Bitmap is set to 1. |
| } | | | |
| For (l=0; l<Num_AMSs; l++) { | | Num_AMSs indicates the number of paged AMSs in a corresponding paging group 1...32 | |
|    Deregistration Identifier | 18 | Used to indicate Deregistration ID for the MS to be paged. | Present if the S-SFH Network Configuration bit == 0b0 |
|    ... | | | |
|    Action code | 1 | Used to indicate the purpose of the AAI-PAG-ADV message 0b0: perform network reentry 0b1: perform ranging for location update | |
|    } | | | |
| } | | | |

Table 10 shows an example of the AAI-PAG-ADV message according to an embodiment of the present invention.

TABLE 10

| Field | Size (bits) | Value/Description | Condition |
|---|---|---|---|
| Paging_Group_IDs bitmap | L | Indicate that the paging information for the corresponding paging group is included in AAI-PAG-ADV message The length of Paging_Group_IDs bitmap is same as Num_PGIDs in PGID-Info message. 0: the paging information for the corresponding PGID is not included 1: the paging information for the corresponding PGID is included | L equals the Num_PGIDs in PGID-Info message |
| For (i=0; i<M; i++) { | | | M equals the number of Bits in Paging_Group_IDs bitmap whose bit is set to 1. |
| For (j=0; j<N; j++) { | | | N equals the number of M2M group in corresponding paging group. |
|    M2M Group ID | | Used to indicate M2M Group to be paged. | |
|    Action code | 1 | Used to indicate the purpose of the AAI-PAG-ADV message. 0b0: All M2M devices within the corresponding M2M Group perform the network reentry. 0b1: All M2M devices within the corresponding M2M Group perform the ranging for location update. | |
|    For (k=0; k<Num_M2M devices; k++) { | | Num_M2M devices indicates the number of paged M2M devices in a corresponding M2M group. | |
|       Deregistration Identifier | 18 | Used to indicate Deregistration ID for the M2M device to be paged. | Optional Shall be presented when the M2M devices are individually paged. |
|       Action code | 1 | Used to indicate the purpose of the AAI-PAG-ADV message 0b0: perform network reentry 0b1: perform ranging for location update | Optional Shall be presented when the M2M devices are individually paged. |
|    } | | | |

TABLE 10-continued

| Field | Size (bits) | Value/Description | Condition |
|---|---|---|---|
| M2M device Bitmaps | | Bitmap to indicate the allocation for transmission of the AAI-RNG-REQ message among paged M2M devices. The size of the bitmap is equal to the paged M2M devices in a M2M group. 0b0: There is no allocation for AAI-RNG-REQ message. 0b1: There is an allocation for AAI-RNG-REQ message. | Optional Shall be presented when the M2M devices are individually paged. |
| UL Basic Assignment A-MAP IE offset | | Indicates the start of the UL Basic Assignment A-MAP IE used for allocations of AAI-RNG-REQ message. Resources are allocated in order of paged devices among the devices which M2M device bitmaps are set to 1. | Optional Shall be presented if there is a M2M device bitmaps which are set to 1. |
| } For (l=0; l<Num_AMSs; l++) { | | Num AMSs indicates the number of paged AMSs in a corresponding paging group 1...32 | |
| Deregistration Identifier | 18 | Used to indicate Deregistration ID for the MS to be paged. | Present if the S-SFH Network Configuration bit == 0b0 |
| ... Action code | 1 | Used to indicate the purpose of the AAI-PAG-ADV message 0b0: perform network reentry 0b1: perform ranging for location update | |
| } } | | | |

Meanwhile, the fixed M2M device performs periodic ranging in an idle mode, and as a result, a method of performing UL synchronization such as power adjustment will be described. In the case of the fixed M2M device, the channel environment is almost not changed and the UL synchronization is almost not changed, but power adjustment between the M2M device and the base station may be required due to an effect of an environment such as a temperature. Accordingly, a method of allocating a periodic ranging timer to the M2M device in the idle mode may be proposed, and the UL synchronization of the M2M device in the idle mode may be secured.

To this end, the periodic ranging timer for the fixed M2M device may be included in an AAI-SCD message. Table 11 shows an example of the periodic ranging timer included in the AAI-SCD message.

TABLE 11

| Field | Size (bits) | Value/Description | Condition |
|---|---|---|---|
| Period of Periodic Ranging Timer | 3 | It is the period of Periodic Ranging timer which is broadcasted by the ABS. It has 3 bits to represent the value among {2, 4, 7, 10, 15, 20, 25, 35} second | |
| Period of Periodic Ranging Timer for fixed (M2M) device | 3 | It is the period of Periodic Ranging timer which is broadcasted by the ABS. It has 3 bits to represent the value among {1, 2, 4, 8, 16, 32, 64, 128} minute | |

The base station transmits the AAI-RNG-REQ message to the fixed M2M device by a unicast to perform adjustment of the UL transmission parameter. That is, the AAI-RNG-REQ message may include information regarding timing offset adjustment, power level adjustment, and frequency offset adjustment. The M2M device receives the AAI-RNG-REQ message to perform the UL synchronization with the base station.

Further, the M2M device may receive an idle mode timer for performing timer based location updating through the AAI-DREG-RSP message when the M2M device enters the idle mode. In this case, the fixed M2M device performs periodic ranging before the idle mode timer is expired to maintain the UL synchronization with the base station.

Figure 16:
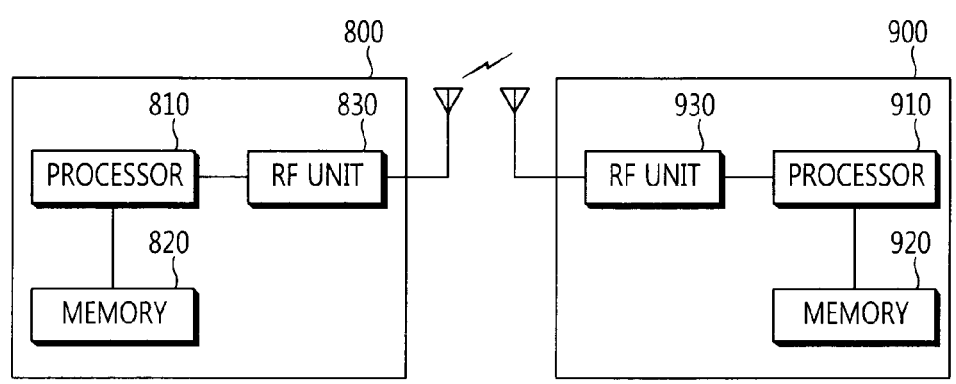
FIG. 16 is a block diagram showing wireless communication system to implement an embodiment of the present invention.

FIG. 16 is a block diagram showing wireless communication system to implement an embodiment of the present invention.

A BS 800 may include a processor 810, a memory 820 and a radio frequency (RF) unit 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The RF unit 830 is operatively coupled with the processor 810, and transmits and/or receives a radio signal.

An M2M device 900 may include a processor 910, a memory 920 and a RF unit 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The RF unit 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The RF units 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the spirit and scope of the appended claims.

What is claimed is:

1. A method for performing a ranging process in a wireless communication system, the method comprising:
   receiving, by the M2M device, a paging message from a base station;
   transmitting, by the M2M device, a bandwidth request (BR) preamble sequence to the base station,
   wherein the BR preamble sequence is transmitted through a bandwidth request channel (BRCH) or an M2M bandwidth request channel (BRCH) allocated by the paging message;
   receiving, by the M2M device, a first uplink (UL) grant for a UL resource for transmission of a BR header from the base station;
   transmitting, by the M2M device, the BR header to the base station through the UL resource allocated by the first UL grant,
   wherein the BR header is configured with a station identifier (STID),
   wherein the BR header includes a ranging request indication parameter having a size of 1 bit, and
   wherein the ranging request indication parameter indicates whether to transmit a ranging request message;
   receiving, by the M2M device, a second UL grant for a UL resource for transmission of the ranging request message; and
   transmitting, by the M2M device the ranging request message through the UL resource allocated by the second UL grant.

2. The method of claim 1, wherein the second UL grant is received through a CDMA allocation A-MAP IE.

3. The method of claim 1, further comprising transmitting a ranging response message to the base station as a response to the ranging request message.

4. A method for performing a ranging process in a wireless communication system, the method comprising:
   receiving, by the M2M device, a paging message from a base station;
   transmitting, by the M2M device, a bandwidth request (BR) preamble sequence, an M2M group identifier (ID), and a pre-defined BR index,
   wherein all of the BR preamble sequence, the M2M group ID, and the pre-defined BR index are transmitted through a bandwidth request channel (BRCH) or a M2M bandwidth request channel (BRCH) allocated by the paging message, and
   wherein the pre-defined BR index is used for the ranging process;
   receiving, by the M2M device, an uplink (UL) grant for receiving a UL resource for transmission of a ranging request message from the base station; and
   transmitting, by the M2M device, the ranging request message to the base station through the UL resource allocated by the UL grant.

5. The method of claim 4, wherein the pre-defined BR index is included in a pre-defined BR index parameter.

6. The method of claim 5, wherein the pre-defined BR index parameter includes a BR Action field.

7. The method of claim 4, wherein the second UL grant is received through a CDMA allocation A-MAP IE.

8. The method of claim 4, further comprising transmitting a ranging response message to the base station as a response to the ranging request message.

* * * * *